US010148736B1

(12) United States Patent
Lee et al.

(10) Patent No.: US 10,148,736 B1
(45) Date of Patent: Dec. 4, 2018

(54) EXECUTING PARALLEL JOBS WITH MESSAGE PASSING ON COMPUTE CLUSTERS

(71) Applicant: Amazon Technologies, Inc., Reno, NV (US)

(72) Inventors: Tin-Yu Lee, Seattle, WA (US); Rejith George Joseph, Seattle, WA (US); Scott Michael Le Grand, Soquel, CA (US); Saurabh Dileep Baji, Seattle, WA (US); Peter Sirota, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 687 days.

(21) Appl. No.: 14/281,582

(22) Filed: May 19, 2014

(51) Int. Cl.
*H04L 29/08* (2006.01)
*G06F 9/50* (2006.01)

(52) U.S. Cl.
CPC ............ *H04L 67/10* (2013.01); *G06F 9/5066* (2013.01)

(58) Field of Classification Search
CPC ................................ G06F 9/5066; H04L 67/10
USPC ........................................................ 709/201
See application file for complete search history.

(56) References Cited

U.S. PATENT DOCUMENTS

| 7,181,014 | B1* | 2/2007 | Srivastava | H04L 9/0833 380/278 |
| 8,418,181 | B1* | 4/2013 | Sirota | H04L 67/00 709/201 |
| 9,292,350 | B1* | 3/2016 | Pendharkar | G06F 9/5044 |
| 2005/0044356 | A1* | 2/2005 | Srivastava | H04L 9/0827 713/163 |
| 2005/0097097 | A1* | 5/2005 | Hunt | H04L 41/042 |
| 2007/0143762 | A1* | 6/2007 | Arnold | G06F 9/5044 718/103 |
| 2008/0183853 | A1* | 7/2008 | Manion | H04L 12/4641 709/223 |
| 2010/0281166 | A1 | 11/2010 | Buyya et al. | |
| 2011/0055549 | A1* | 3/2011 | Ei Khayat | H04L 45/04 713/150 |

(Continued)

OTHER PUBLICATIONS

Plimpton & Devine, "MapReduce in MPI for large-scale graph algorithms", Nov. 29, 2010 version to appear in Parallel Computing (vol. 37, No. 9), pp. 1-39.

(Continued)

*Primary Examiner* — James E Springer
(74) *Attorney, Agent, or Firm* — Robert C. Kowert; Meyertons, Hood, Kivlin, Kowert & Goetzel, P.C.

(57) ABSTRACT

A client may submit a job to a service provider that processes a large data set and that employs a message passing interface (MPI) to coordinate the collective execution of the job on multiple compute nodes. The framework may create a MapReduce cluster (e.g., within a VPC) and may generate a single key pair for the cluster, which may be downloaded by nodes in the cluster and used to establish secure node-to-node communication channels for MPI messaging. A single node may be assigned as a mapper process and may launch the MPI job, which may fork its commands to other nodes in the cluster (e.g., nodes identified in a hostfile associated with the MPI job), according to the MPI interface. A rankfile may be used to synchronize the MPI job and another MPI process used to download portions of the data set to respective nodes in the cluster.

20 Claims, 16 Drawing Sheets

(56) References Cited

U.S. PATENT DOCUMENTS

| | | | |
|---|---|---|---|
| 2011/0138475 A1* | 6/2011 | Gordon | H04L 9/085 726/26 |
| 2012/0106735 A1* | 5/2012 | Fukuda | H04L 9/083 380/255 |
| 2012/0233522 A1* | 9/2012 | Barton | H04L 67/06 714/758 |
| 2012/0240135 A1* | 9/2012 | Risbood | G06F 8/61 719/328 |
| 2012/0254193 A1* | 10/2012 | Chattopadhyay | G06F 17/30979 707/747 |
| 2013/0111488 A1* | 5/2013 | Gatti | G06Q 10/06 718/103 |
| 2013/0297624 A1* | 11/2013 | Raghunathan | G06F 17/30067 707/752 |
| 2013/0318347 A1* | 11/2013 | Moffat | H04L 63/08 713/168 |
| 2013/0318525 A1* | 11/2013 | Palanisamy | G06F 9/5066 718/1 |
| 2014/0047342 A1* | 2/2014 | Breternitz | G06F 9/5061 715/735 |
| 2014/0047422 A1 | 2/2014 | Ravi et al. | |
| 2014/0143251 A1 | 5/2014 | Wang et al. | |
| 2014/0188918 A1* | 7/2014 | Shamlin | G06F 17/30539 707/756 |
| 2014/0208404 A1* | 7/2014 | Brouwer | G06F 21/62 726/6 |
| 2014/0281477 A1* | 9/2014 | Nayshtut | H04L 9/0825 713/150 |
| 2014/0358869 A1* | 12/2014 | Kim | G06F 9/5066 707/692 |
| 2015/0006606 A1* | 1/2015 | Fleury | H04L 67/10 709/201 |
| 2015/0127649 A1* | 5/2015 | Felch | G06F 17/30477 707/737 |
| 2015/0180971 A1* | 6/2015 | Varney | H04L 67/289 709/204 |
| 2015/0200867 A1* | 7/2015 | Dutta | H04L 49/3045 709/226 |
| 2016/0065548 A1* | 3/2016 | Brouwer | H04L 63/061 713/171 |
| 2016/0094592 A1* | 3/2016 | Koch | G06F 17/30312 709/204 |

OTHER PUBLICATIONS

Plimpton & Shead, "Streaming data analytics via message passing with application to graph algorithms", submitted to Journal of Parallel and Distributed Computing (JPDC) in Oct. 25, 2012, pp. 1-25.

* cited by examiner

US 10,148,736 B1

EXECUTING PARALLEL JOBS WITH MESSAGE PASSING ON COMPUTE CLUSTERS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients.

Examples of such large-scale systems include online merchants, internet service providers, online businesses such as photo processing services, corporate networks, cloud computing services (including high-performance computing services for executing large and/or complex computations), web-based hosting services, etc. These entities may maintain computing resources in the form of large numbers of computing devices (e.g., thousands of hosts) which are hosted in geographically separate locations and which are configured to process large quantities (e.g., millions) of transactions daily or even hourly.

One conventional approach for harnessing these resources to process data is the MapReduce model for distributed, parallel computing. In a MapReduce system, a large data set may be split into smaller chunks, and the smaller chunks may be distributed to multiple computing nodes in a compute cluster for the initial "map" stage of processing. Multiple nodes may also carry out a second "reduce" stage of processing based on the results of the map stage. Other approaches often applied in distributed, parallel computing rely on message passing between pairs of computing nodes in a cluster. For example, MPI is a portable (i.e. language-independent) communications protocol and message passing interface standard (API) that is sometimes employed in parallel programming to facilitate coordination between the computing nodes that collectively execute a parallel application.

Figure 1:
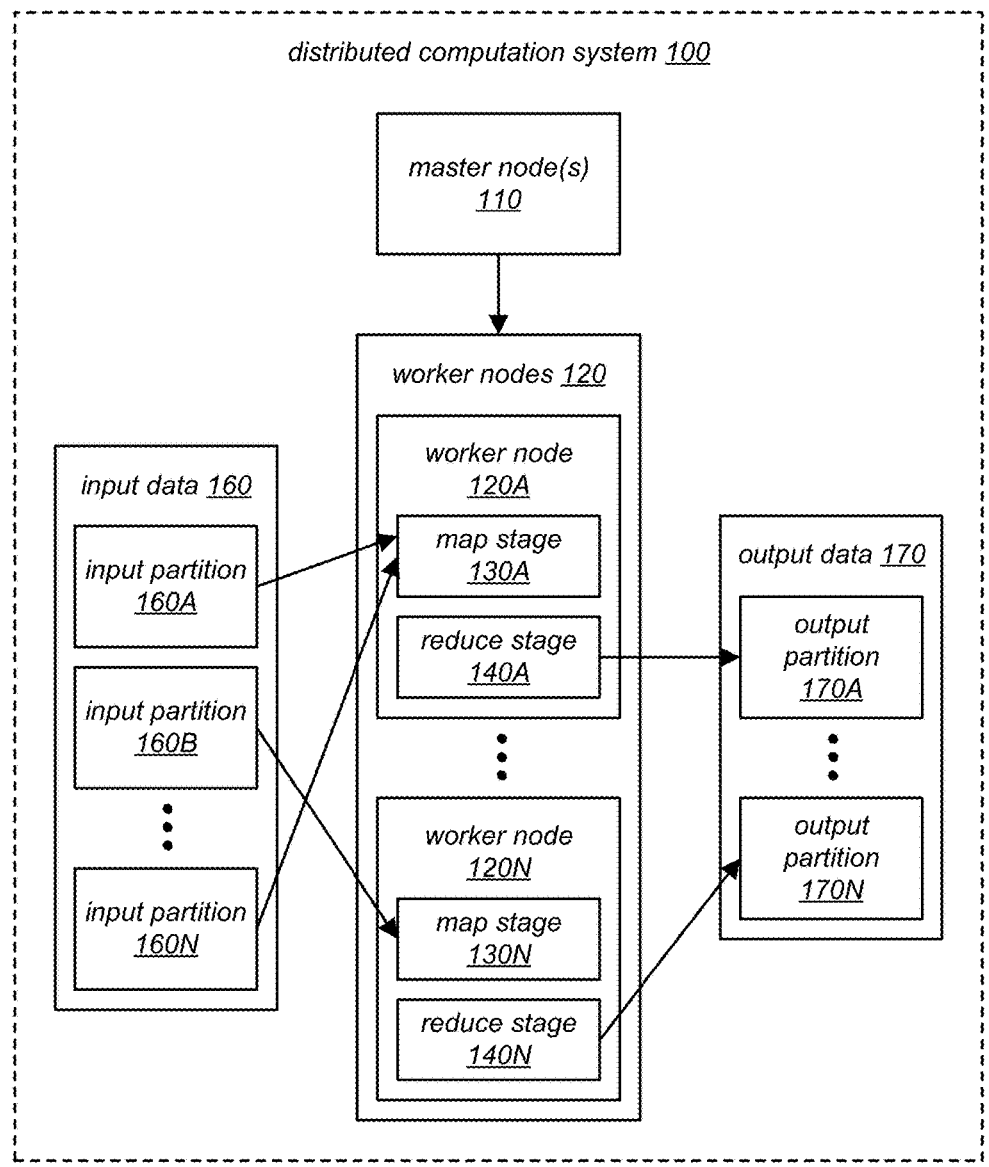
FIG. 1 illustrates an example system environment for performing a MapReduce job, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Various embodiments of methods and apparatus for executing parallel jobs with message passing on distributed computing systems are described. In general, in the distributed computing systems described herein, one or more compute nodes may access portions of a data set from data storage, process the data, and output the processed data to data storage (which may be, but is not necessarily, the same data storage from which the data set was accessed). The distributed computing system may be implemented according to a distributed computing framework. As a non-limiting example of a framework for implementing such distributed computing systems, the Apache™ Hadoop® open source software library provides a framework that allows for the distributed processing of large data sets across clusters of compute nodes using simple programming models. This library provides an implementation of a distributed processing architecture called MapReduce, which includes a programming model for processing large data sets with a parallel, distributed algorithm on a compute cluster.

In various embodiments, a MapReduce program may include a Map( ) procedure (sometimes referred to herein as a "mapper process" or a "mapper") that performs filtering and sorting and a Reduce( ) procedure (sometimes referred to herein as a "reducer process" or a "reducer") that performs a summary operation. For example, under this approach, a parallel application (or a parallel computation or task of an application) may be mapped to a set of computing nodes (e.g., hosts or servers) for processing. The results of the computation performed by those computing nodes may then be reduced down to a single output data set. One node, designated as the master node, may control the distribution of tasks by the other computing nodes (e.g., slave nodes that may also be referred to as "worker nodes"). In some embodiments, a service provider may provision a collection of virtualized resource instances as computing nodes in a MapReduce cluster, and the computing nodes of the MapReduce cluster may obtain data from and/or write data to virtualized storage resources via an object storage service. Note that a MapReduce cluster may be created with an arbitrary number of computing nodes, and not all of the computing nodes of a MapReduce cluster need to be assigned (or configured) as mappers or reducers. Also note that there may not (necessarily) be a one-to-one mapping between mapper process (or reducer processes) and computing nodes. For example, multiple mapper processes may be run on a single computing node.

As noted above, MPI is a portable (i.e. language-independent) communications protocol and message passing interface standard (API) for parallel programming. An MPI implementation uses groups (which are ordered sets of processes) and communicator objects to define which collections of processes may communicate with each other. For example, each group may be associated with a communicator object and each process in a group may be associated with an integer rank that is unique within the group. The communicator object may be thought of as encompassing a groups of processes that may communicate with each other using MPI messages (each of which must specify the communicator with which the message-passing processes are associated as a "tag" in the message).

The MPI interface standard and corresponding library functions support both point-to-point communications and collective communications. For example, an MPI implementation typically supports various types of point-to-point send and receive operations (including synchronous send operations, blocking and non-blocking send/receive operations, and buffered send operations), collective synchronization operations (in which processes wait until all members of a group reach a synchronization point), collective data movement operations (such as broadcast or gather operations), and reduction operations (e.g., which may be used to combine partial results of computations produced by different nodes or CPU cores)

In various implementations, MPI processes are able to dynamically create new MPI processes and/or to dynamically establish communication with other MPI processes that have already been created. For example, an MPI implementation may include an interface that allows one MPI process to spawn one or more instances of another MPI process, each of which can communicate with the parent process and with each other.

An MPI program may comprise, for example, an MPI include file (e.g., "mpi.h"), one or more calls to methods for initializing the MPI environment and to begin executing parallel work (which may include making calls to MPI message passing methods), and (once the parallel work has been completed) calls to one or more methods to terminate the MPI environment. For example, in some implementations, an agent that starts the program (e.g., an "mpirun" or "mpiexec" agent) may be responsible for assigning processes to compute nodes (or to particular CPU cores thereof) as part of the initialization process.

As noted above, both MapReduce and MPI are commonly used parallel programming paradigms. For example, either of these techniques may be employed to perform high-performance computing (HPC) applications or large and/or complex computations thereof (e.g., computational fluid dynamics simulations for aerospace or mechanical engineering, or molecular fluid dynamics simulations) in distributed computing environments. Although customers may wish to run MPI programs on top of a MapReduce cluster (e.g., one that is provided by a service), this may be difficult, if not impossible, with typical MapReduce implementations. For example, a typical implementation of the MapReduce architecture does not inherently support the node-to-node communication techniques used in MPI programs (e.g., direct messaging between worker nodes, preferably using secure communication techniques), but instead relies on communication only between a master node and each of the worker nodes.

In various embodiments, the systems and methods described herein may provide a framework in which MPI programs may be executed on top of MapReduce clusters on behalf of clients (e.g., client applications, customer, or service subscribers). As described in more detail below, these systems and methods may be used to configure a secure MapReduce job flow in which the worker nodes (hosts) can communicate with each other using MPI messaging. For example, secure communication between any pair of worker nodes (hosts) using a secure shell type protocol requires a common key pair. In some embodiments of the systems described herein, in order to provide secure communications for MPI messaging (e.g., using a secure shell type protocol), a single pair of keys may be created and shared between all of the computing nodes of a MapReduce cluster. In addition, in order to execute MPI jobs using a MapReduce job flow, an MPI job may be submitted as a single MapReduce step (e.g., one with only a single mapper process and no reducer process). The mapper process may then call an mpirun or mpiexec agent in order to launch the MPI job, which may then fork its own commands to all of the computing nodes (hosts) according to the MPI interface and protocols.

Various embodiments of methods and systems for performing MapReduce jobs and/or MPI jobs on distributed systems (e.g., MapReduce clusters) are described herein. FIG. 1 illustrates an example system environment that may be used for performing MapReduce jobs and that may also be used to perform MPI jobs, according to at least some embodiments. The example system environment may implement a distributed computation system 100. The distributed computation system 100 may include one or more master nodes 110 and a plurality of worker nodes 120 such as worker nodes 120A-120N. The master node(s) 110 may represent one or more coordinator processes that coordinate computations performed by the worker nodes 120. The worker nodes may also be referred to herein as "worker hosts," "workers," or "hosts." The distributed computation system 100 may use one or more networks or interconnections to couple the various components. Elements of the distributed computation system 100 may be located in any suitable location relative to one another, from being virtual compute instances hosted on the same computing hardware to being different physical compute instances hosted in the same data center to being geographically remote. In some embodiments, the master node(s) 110 and worker nodes 120 may implement a MapReduce architecture in which the worker nodes perform similar tasks concurrently under the direction of the master node(s). However, it is contemplated that the distributed computation system 100 may implement other types of distributed computation architectures instead of or in addition to MapReduce.

Using the distributed computation system 100, a set of input data 160 may be processed by the worker nodes 120 to produce a set of output data 170. The input data 160 may be split into a plurality of partitions, such as input partitions 160A and 160B through 160N. One or more of the partitions of the input data 160 may be assigned to each of the worker nodes 120. The input data 160 may be split into partitions on any suitable basis. For example, partition boundaries may be based on the boundaries between individual records, individual lines of data, etc. An individual partition may include elements of input data, such as related items or families of items that are intended to be processed together by a single worker node. Although three partitions 160A, 160B, and 160N are illustrated for purposes of example, it is contemplated that any suitable number of partitions of input data may be processed using the distributed computation system 100. The assignment of individual partitions to individual worker nodes as shown in FIG. 1 is presented for purposes of example and illustration; it is contemplated that any suitable assignment of individual partitions to individual worker nodes may be used with the distributed computation system 100.

In some embodiments, the master node(s) 110 may provide individual partition(s) of the input data 160 to individual worker nodes, e.g., by performing aspects of the partitioning of the input data and/or aspects of the assignment of individual partitions to individual worker nodes. In one embodiment, the master node(s) 110 may send data indicative of partition assignments to individual worker nodes, and each worker node may acquire its one or more partitions of input data using any suitable technique. For example, a worker node may read a portion of the input data from one or more files or storage locations in one or more storage devices that are accessible to the worker nodes, e.g., over a network. Alternatively, the master node(s) 110 may directly send the relevant partition(s) to individual worker nodes using a network. In various embodiments, the partition(s) of input data to be processed using a particular worker node may be loaded into memory at the particular worker node either partially or entirely before the processing of the partition(s) is initiated.

Each of the worker nodes 120 may perform any suitable processing tasks to generate one or more partitions of the output data 170 based on one or more partitions of the input data 160. In one embodiment, the processing tasks implemented using the worker nodes 120 may be provided by the master node(s) 110, e.g., by sending program code to the worker nodes or instructing the worker nodes to load the program code from one or more storage locations. At least a portion of the processing tasks performed by the worker nodes 120 may be performed concurrently, i.e., in parallel relative to each other. In some embodiments, each of the worker nodes 120 may perform similar tasks and/or implement similar algorithms to process its partition(s) of the input data. As a result of the processing of the input data 160, each of the worker nodes 120 may produce one or more partitions of output data 170. Although two output partitions 170A and 170N are illustrated for purposes of example, it is contemplated that any suitable number of output partitions may be generated using the distributed computation system 100. As they are produced by the worker nodes 120, the output partitions 170A-170N may be stored in one or more storage locations on one or more storage devices that are accessible to the worker nodes. The output partitions 170A-170N may also be referred to as final output data. In one embodiment, the output partitions 170A-170N may be further processed by the master node(s), e.g., by aggregating or concatenating the individual partitions into a single output file.

The computation performed by each of the worker nodes 120 may include multiple stages of computation, such as a first stage and a second stage. The first stage may be a map stage (in which a mapper process is performed), such as map stage 130A performed by worker node 120A and map stage 130N performed by worker node 120N. The second stage may be a reduce stage (in which a reducer process is performed), such as reduce stage 140A performed by worker node 120A and reduce stage 140N performed by worker node 120N. In one embodiment, the map stage may include any computation(s) to generate intermediate output based on the input data 160. In one embodiment, the intermediate output may be partitioned but not necessarily sorted. As used herein, the term "partitioned" indicates that related elements of data are grouped together into partitions. Typically, the elements of data in a particular partition are intended to be processed using the same host. In one embodiment, the reduce stage may include any computation(s) to generate final output 170 based on the intermediate output. For example, the reduce stage may aggregate elements of the data produced by the map stage.

It is contemplated that the distributed computation system 100 may include additional components not shown, fewer components than shown, or different combinations, configurations, or quantities of the components shown. Although two worker nodes 120A and 120N are illustrated for purposes of example, it is contemplated that any suitable number of worker nodes may be used in conjunction with the distributed computation system 100. Although one master node 110 is illustrated for purposes of example, it is contemplated that any suitable number of master nodes 110 may be used in conjunction with the distributed computation system 100. In various embodiments, any of the worker nodes 120 and/or master node(s) 110 may be implemented as virtual compute instances or as physical compute instances. The distributed computation system 100 may include one or more computing devices, any of which may be implemented by a computing device similar to the example computer system illustrated in FIG. 16. In various embodiments, the functionality of the different components of the distributed computation system 100 may be provided by the same computing device or by different computing devices. If any of the various components are implemented using different computing devices, then the respective computing devices may be communicatively coupled, e.g., via one or more networks. Each component of the distributed computation system 100 may represent any combination of software and hardware usable to perform their respective functions, as discussed as follows.

In some embodiments, the distributed computation system 100 may manage the allocation of network-accessible resources. Networks set up by an entity such as a company or a public sector organization to provide one or more services (such as various types of cloud-based computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In some embodiments, operators of provider networks may implement a flexible set of resource reservation, control, and access interfaces for their clients. For example, a provider network may implement a programmatic resource reservation interface (e.g., via a web site or a set of web pages) that allows clients to learn about, select, purchase access to, and/or reserve resource instances. In one embodiment, resources may be reserved on behalf of clients using a client-accessible service that implements the distributed computation system 100. According to one such embodiment, the distributed computation system 100 in such an environment may receive a specification of one or more tasks to be performed for a client, along with a set of input data or an indication of a source of input data to be used by the task(s). In response, the distributed computation system 100 may determine an execution plan for implementing the task(s) using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client. The distributed computation system 100 may schedule an execution of the task(s) using the selected resources.

In some embodiments, the client may use one or more suitable interfaces (such as one or more web pages, an application programming interface (API), or a command-line interface) to specify the task(s) to be implemented, the input data set, the computing resources to be used, and/or a time at which the task(s) should be initiated. In one embodiment, the client may be able to view the current execution status of the task(s) using the interface(s). In one embodiment, additional information about executed tasks may be available via the interface(s), such as program output, error logs, exception logs, and so on.

Figure 2:
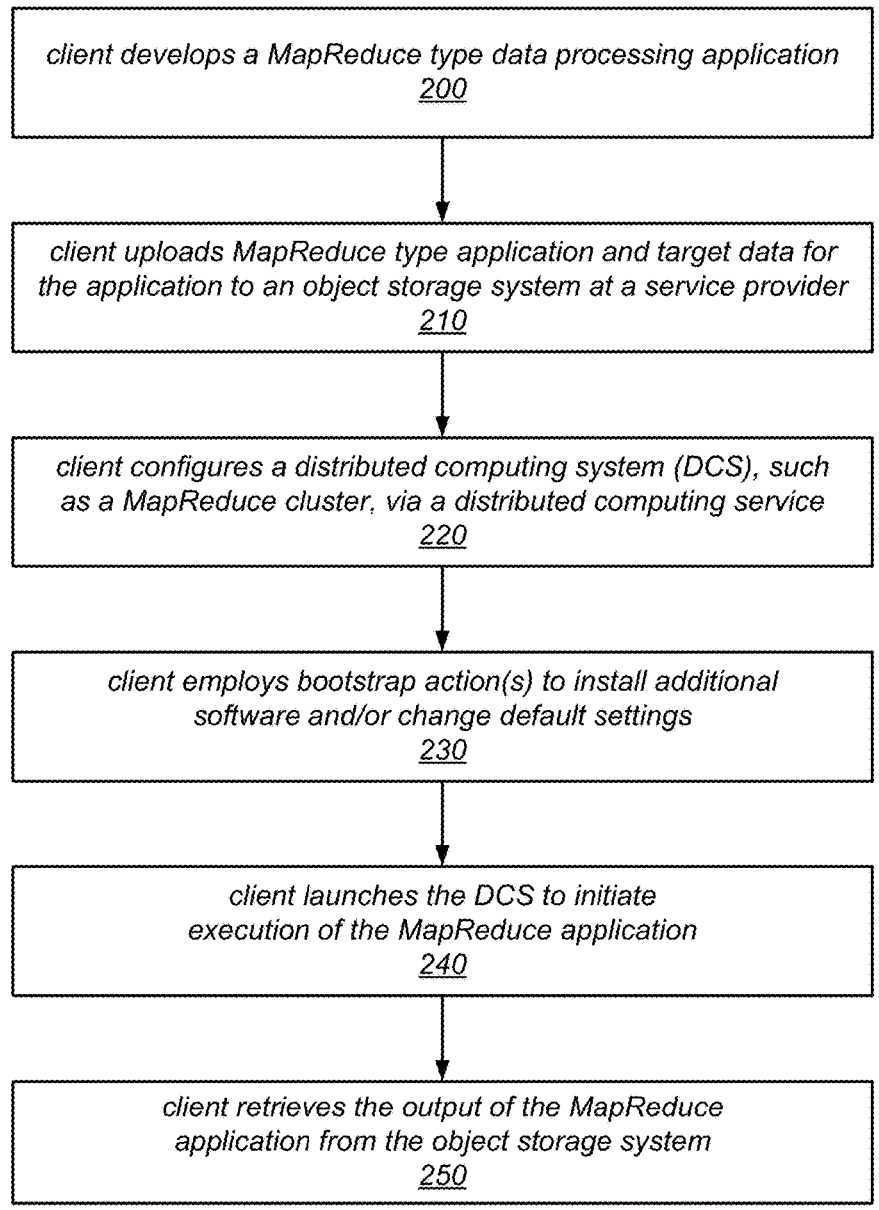
FIG. 2 is a flow diagram illustrating one embodiment of a method for performing a MapReduce type data processing application in a distributed computing system.

One embodiment of a method for performing a MapReduce type data processing application in a distributed computing system (on a MapReduce cluster) is illustrated by the flow diagram in FIG. 2. As illustrated at 200, in this example, the method may include a client developing a MapReduce type data processing application. Note that, in different embodiments, such an application may be developed using any of a variety of programming languages. The method may include the client uploading the MapReduce type application and target data for the application to an object storage system at a service provider, as in 210. For example, the data may be uploaded to one or more physical storage devices of the service provider using an import feature or other input interface of the service, by establishing a dedicated network connection to the service provider, or by writing the data directly to a cluster that is already running, in different embodiments.

As illustrated in this example, the method may include the client configuring (or requesting the configuration of) a distributed computing system (DCS), such as a MapReduce cluster, via a distributed computing service, as in 220. For example, the client may configure (or request the configuration of) a cluster of computing nodes (hosts) to collectively execute MapReduce type applications on behalf of service clients, where each node (host) includes one or more CPU cores. In some embodiments, the client may be able to specify various parameters of the cluster and/or the job to be executed on the cluster (e.g., the number of virtualized resource instances to provision in the cluster, the types of instances to use, the applications to install, and/or the locations of the application and its target data) through a GUI, command line interface, script, API, or another interface mechanism.

As illustrated at 230 in FIG. 2, the method may include the client employing one or more bootstrap actions to install additional software and/or to change one or more default configuration settings of the DCS (e.g., the MapReduce cluster). Bootstrap actions are scripts that are run on each of the cluster nodes when the cluster is launched (e.g., before the MapReduce application starts and before the node begins processing data). In various embodiments, the client may invoke custom bootstrap actions, or may invoke predefined bootstrap actions provided by the service provider. The method may also include the client launching the DCS (e.g., the MapReduce cluster) to initiate the execution of the MapReduce application, as in 240, and (as the application executes or once it has finished executing), the client retrieving the output of the MapReduce application from the object storage system, as in 250.

Note that, in some embodiments, the service provide may automatically terminate the DCS (e.g., the MapReduce cluster) when processing of the MapReduce application is complete (not shown). In other embodiments, the DCS (e.g., the MapReduce cluster) may be kept running after processing of the MapReduce application is complete, and the client may be able to submit more work to the DCS/cluster. Note also that, in some embodiments, the client may be able to monitor the health of the DCS (e.g., the MapReduce cluster) and/or the progress of the MapReduce application various monitoring tools or utilities that are exposed by the service provider using (e.g., through a GUI, command line interface, script, API, or another interface mechanism). In some embodiments, the client may be able to add capacity to or remove capacity from the DCS/cluster at any time in order to handle more or less data. The service provider may also expose one or more debugging utilities (e.g., through a GUI, command line interface, script, API, or another interface mechanism), in some embodiments.

Figure 3:
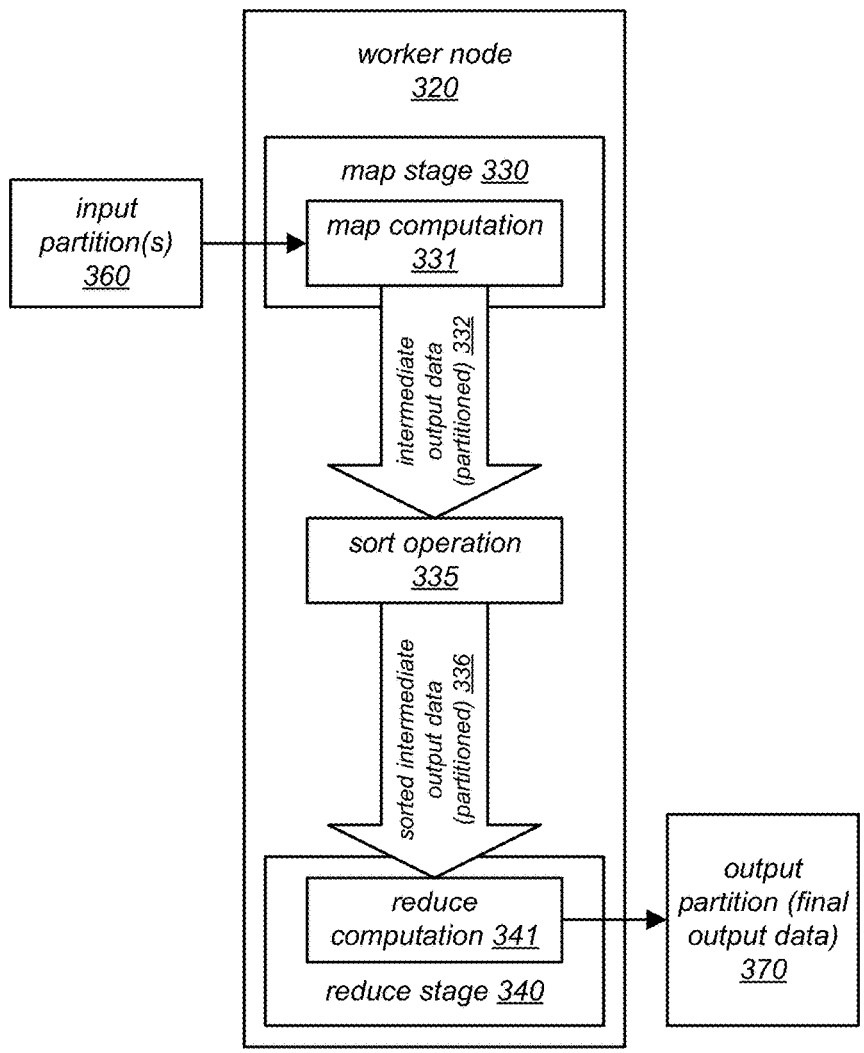
FIG. 3 illustrates a worker node configured for performing a MapReduce job, according to one embodiment.

One embodiment of a worker node that is configured for performing MapReduce jobs (and that can also be used for performing MPI jobs, as described herein) is illustrated by the block diagram in FIG. 3. As illustrated in this example, a worker node (such as worker node 320) may use one or more input partition(s) 360 as input and produce an output partition (i.e., final output data) 370. The worker node 320 may be implemented in the same manner as discussed above with respect to worker nodes 120A-120N illustrated in FIG. 1. The processing of the input partition(s) 360 may include a map stage 330 and a reduce stage 340 performed using the worker node 320.

As illustrated in this example, the map stage 330 may include a map computation 331. The map computation 331 may include the execution of program instructions using elements of the input partition(s) 360 as input. The program code used in the map computation 331 may be specified by a master node (such as one of the master nodes 110 illustrated in FIG. 1). The map computation 331 may generate intermediate output data 332. The intermediate output data 332 may be partitioned such that related elements of data are grouped together on the same worker node 320. The partitioning of the intermediate output data 332 may indicate that the intermediate output data 332 contains related elements of data (e.g., data for items and/or families of items). The partitioning of the intermediate output data 332 may indicate that the elements of data in the intermediate output data 332 may be processed together in the reduce stage 340, i.e., processed in the reduce stage using a single worker node and without re-partitioning and distribution to multiple worker nodes, in some cases. In other cases, some or all of the intermediate output data 332 produced in a map stage 330 on one worker node may be further processed in a reduce stage 340 on one or more other worker nodes (e.g., the intermediate output data 332 produced by the worker nodes may be re-partitioned and distributed among the worker nodes for processing in a reduce stage).

In some embodiments, a sort operation 335 may be performed between the map stage 330 and the reduce stage 340. The sort operation 335 may sort elements of data in the intermediate output data 332 to produce sorted intermediate output data 336. The intermediate output data 332 may be sorted based on any suitable key(s) or field(s) of data, such as the key(s) or field(s) of data required by the reduce stage 340.

As illustrated in this example, the reduce stage 340 may include a reduce computation 341. The reduce computation 341 may include the execution of program instructions using elements of the intermediate output data 332 or sorted intermediate output data 336 as input. The program code used in the reduce computation 341 may be specified by a master node (such as one of the master nodes 110 illustrated in FIG. 1). The reduce computation 341 may generate final output data 370. In some embodiments, the reduce computation 341 may perform an aggregation of the intermediate output data 332 or sorted intermediate output data 336. Note that in other embodiments, a sort operation may be performed by the worker node 320 as part of the reduce stage 340. In some embodiments, the map stage 330 and reduce stage 340 may be performed using computations executed on the same worker node 320, and intermediate data 332 or 336 may not be provided to another worker node.

Figure 4:
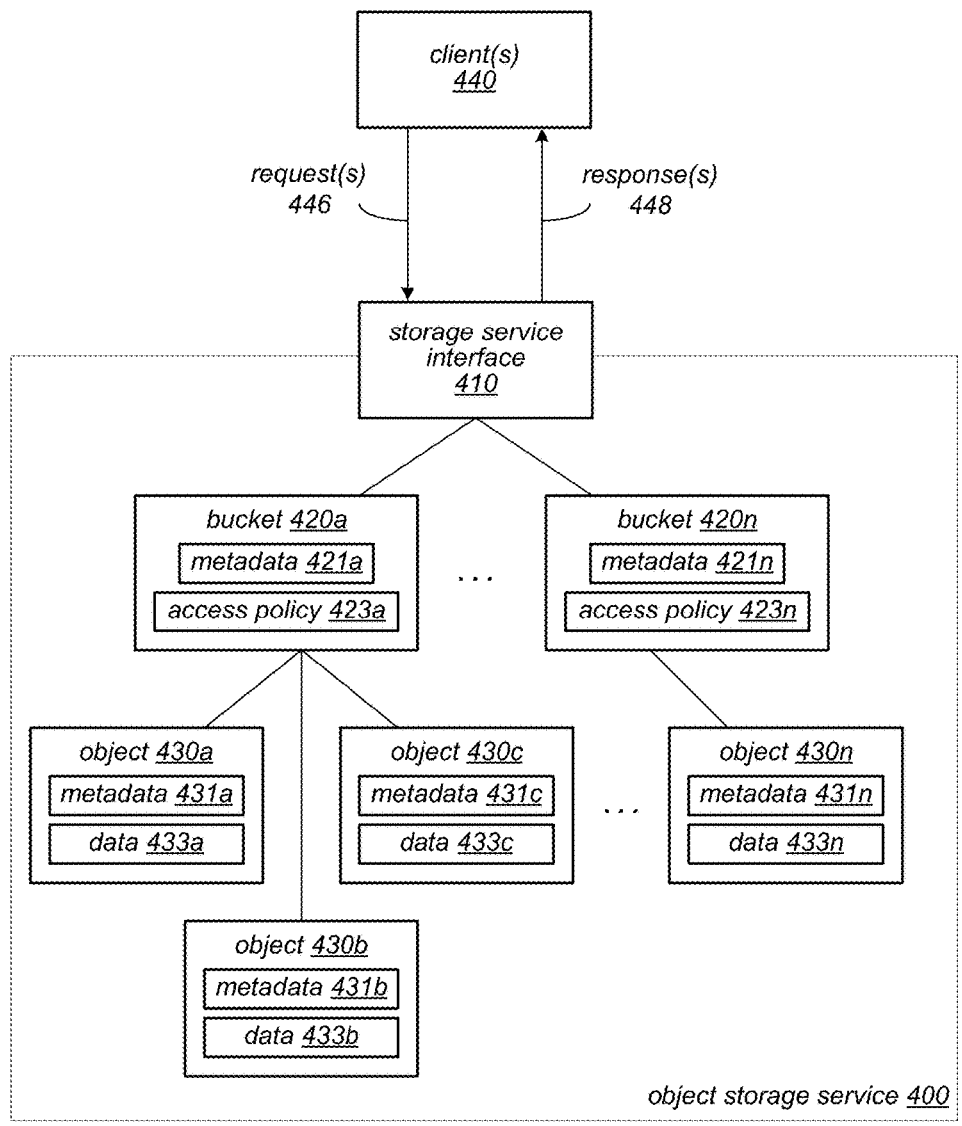
FIG. 4 illustrates an example embodiment of an object storage model for providing virtualized storage resources to clients as a service.

One example embodiment of an unstructured object storage model for providing virtualized storage resources to clients as a service, such as a web service, is illustrated in FIG. 4. In the illustrated model, storage service interface 410 is provided as a client-facing interface to object storage service 400. Storage service interface 410 may, for example, be implemented as, or alternatively may include, an application programming interface (API). According to the model presented to a client 440 by interface 410, the storage service may be organized as an arbitrary number of buckets 420a-n accessible via interface 410. In general, a bucket is a logical container in which objects may be stored in a storage system on behalf of a user, where the objects are the fundamental entities stored in the storage system. In some embodiments, the stored objects may include object data and/or metadata. For example, each object may include a data object portion, and a metadata portion In some embodiments, every object may be contained in a bucket, and every object may be addressable using a combination of a bucket identifier and one or more identifiers of the object itself (e.g., a user key or a combination or a user key and a version identifier).

In the example illustrated in FIG. 4, each bucket 420 may be configured to store an arbitrary number of objects 430a-n, each of which may store data specified by a client 440 of the storage service 400 (shown as data 433a-n) and/or metadata (shown as 431a-n). In various embodiments, metadata 431a-n may be specified by a client 440 or may be generated by object storage service 400. One or more clients 440 may submit requests to the storage service interface to store, retrieve, and, as described in more detail below, perform one or more operations on data object 430. Storage service interface may provide responses 448 to the requests, which may include acknowledgements and/or retrieved data, for example. Generally, in addition to storage and retrieval of data objects, the requests or commands that the storage service 400 may perform may include commands that modify data within the storage service 400. In this way, the clients 440 are not burdened with removing the data from the storage service 400, performing the operations, and then returning the modified data to the storage service. This configuration may save network bandwidth and processing resources for the clients 440, for example.

In some embodiments storage service interface 410 may be configured to support interaction between the storage service 400 and its client(s) 440 according to a web services model. For example, in one embodiment, interface 410 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

In at least some embodiments, the object storage service 400 may be configured to internally replicate data objects for data redundancy and resiliency purposes. However, the object storage service 400 does not guarantee that an access of a data object stored in the storage service 400 will always return a latest or most recent version of the data object. This property of a storage service such as object storage service 400 may be referred to herein as "eventual consistency", as a data object is generally guaranteed to be only eventually consistent across all instances. In other embodiments, object storage service 400 may support a strong consistency model, which may guarantee that an access of a data object stored in the storage service will return a latest or most recent version of the data object.

In some embodiments, an object storage service (such as object storage service 400) may provide storage for a data set that is to be downloaded and processed by a MapReduce application (or computation thereof) or MPI application (or computation thereof) that is executing on a distributed computing system (such as a MapReduce cluster) and/or output data that is produced by such applications. In some embodiments, an object storage service (such as object storage service 400) may provide storage for other types of data or metadata, including, but not limited to, key pairs, hostfiles, rankfiles, or configuration or operating parameters for a MapReduce job or an MPI job, or any other information usable when executing such applications. In other embodiments, any or all of these elements may be stored in one or more object data stores having a different model and/or configuration than that illustrated in FIG. 4.

Note that, in some embodiments, the data object portion of an object may be opaque to the storage system, i.e. it may be treated as a "black box" entry by the storage system. In various embodiments, the default metadata of an object may include, e.g., a name-value pair, the date the object was last modified, and/or an indicator of the content type (i.e., the data type of the contents of the data object portion of the object). In some embodiments, the metadata associated with an object may include system interjected key-value pairs (containing, for example, a creation date and/or a last modified date, or other versioning related metadata), along with user supplied key-value pairs. In some embodiments, metadata associated with and/or stored in an object may include an access control list (ACL). In some embodiments, a developer may be able to specify custom metadata at the time an object is stored. In various embodiments, the amount of metadata that can be associated with a given object may be restricted by the limits of the interface used, and/or the amount of data allowed or supported by the system for a request or response message.

In various embodiments, the storage systems described herein may include support for the following storage related tasks: creating buckets, storing and retrieving data in buckets (e.g., using a unique key, which may be assigned by the developer of the data or owner of the bucket), deleting data, and/or listing stored objects. In some embodiments, a user may need to have special permission (e.g., a particular access role) to be able to perform certain operations in the storage system. For example, a user may need to be designated as a privileged user in the system (and/or for a particular bucket in the system) in order to check a versioning state, modify a versioning state, delete objects and/or keys, retrieve logically deleted data, set permissions on buckets or objects thereof, etc. In another example, a user may need to have a particular access role in order to list stored objects and/or retrieve stored objects. In some embodiments, such permissions may be automatically granted to and/or controlled by the bucket owner. In other embodiments, such privileges may be designated and/or granted to users by other means and/or based on factors other than bucket ownership. In various embodiments, some or all of these permissions may be granted and/or controlled on a bucket basis. In other embodiments, one or more of these permissions may be granted and/or controlled on an individual object basis, or on the basis of the object type or content type.

Figure 5:
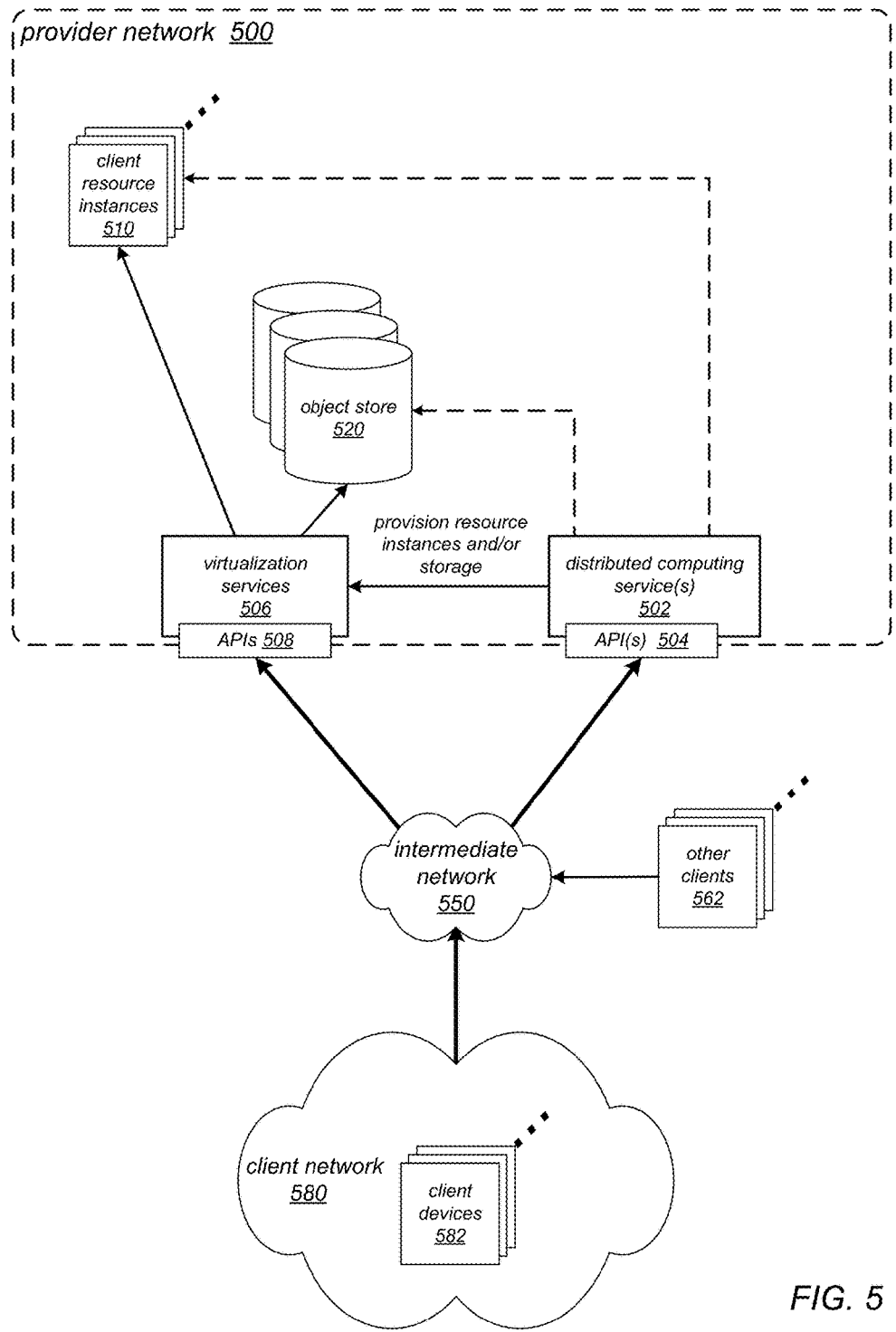
FIG. 5 illustrates an example service provider network environment in which embodiments of methods and apparatus for performing MPI jobs on a MapReduce cluster may be implemented.

Embodiments of a distributed computing system are generally described herein in the context of a service provider that provides to clients, via an intermediate network such as the Internet, virtualized resources (e.g., virtualized computing and storage resources) implemented on a provider network of the service provider. FIG. 5 illustrates an example service provider network environment in which embodiments of methods and apparatus for providing data storage in distributed computing systems may be implemented. Other example environments in which embodiments of a distributed computing system that executes MapReduce jobs and/or MPI jobs on a MapReduce cluster may be implemented are illustrated in other ones of the drawings and are described below. These examples are not intended to be limiting.

In the example illustrated in FIG. 5, the service provider may provide one or more services (referred to as distributed computing service(s) 502) to clients (e.g., clients on client network 582 or other clients 562) via which the clients may provision, manage, and operate distributed computing systems at least partially on a provider network 500. In at least some embodiments, provisioning a distributed computing system via the distributed computing service(s) 502 may include provisioning one or more virtualized computing resources (shown as client resource instances 510) as compute nodes for the distributed computing system and provisioning virtualized storage (shown as object store 520) as data storage for data sets used in the distributed computing system and/or as data storage for results of computations performed on behalf of various clients. Note that client resource instances 510 and/or object store 520 may be otherwise provisioned in various embodiments. For example, as an alternative, in at least some embodiments, a client (e.g., as represented by client network 580) may provision one or more client devices 582 on an external client network as compute nodes for the distributed computing service, while provisioning storage for the data set to be used in the distributed computing system on an object store 520 via distributed computing service(s) 502.

Note that, in at least some embodiments, client(s) may interact with distributed computing service(s) 502 via one or more application programming interfaces (API(s) 504) to request provisioning of computation and storage resources on provider network 500 for specific distributed computing systems (e.g., MapReduce clusters), and distributed computing service(s) 502 may in turn interact with virtualization service(s) 506 via API(s) 508 to actually provision the computation and storage resources on provider network 500. However, in some embodiments, distributed computing service(s) 502 may directly interact with computation and storage resources on provider network to provision or otherwise configure the resources for specific distributed computing systems.

In at least some embodiments, the service provider may implement such distributed computing systems (e.g., MapReduce clusters) on behalf of clients according to a distributed computing framework, for example the Apache™ Hadoop® framework. Note, however, that other frameworks may be used in some embodiments.

Figure 15:
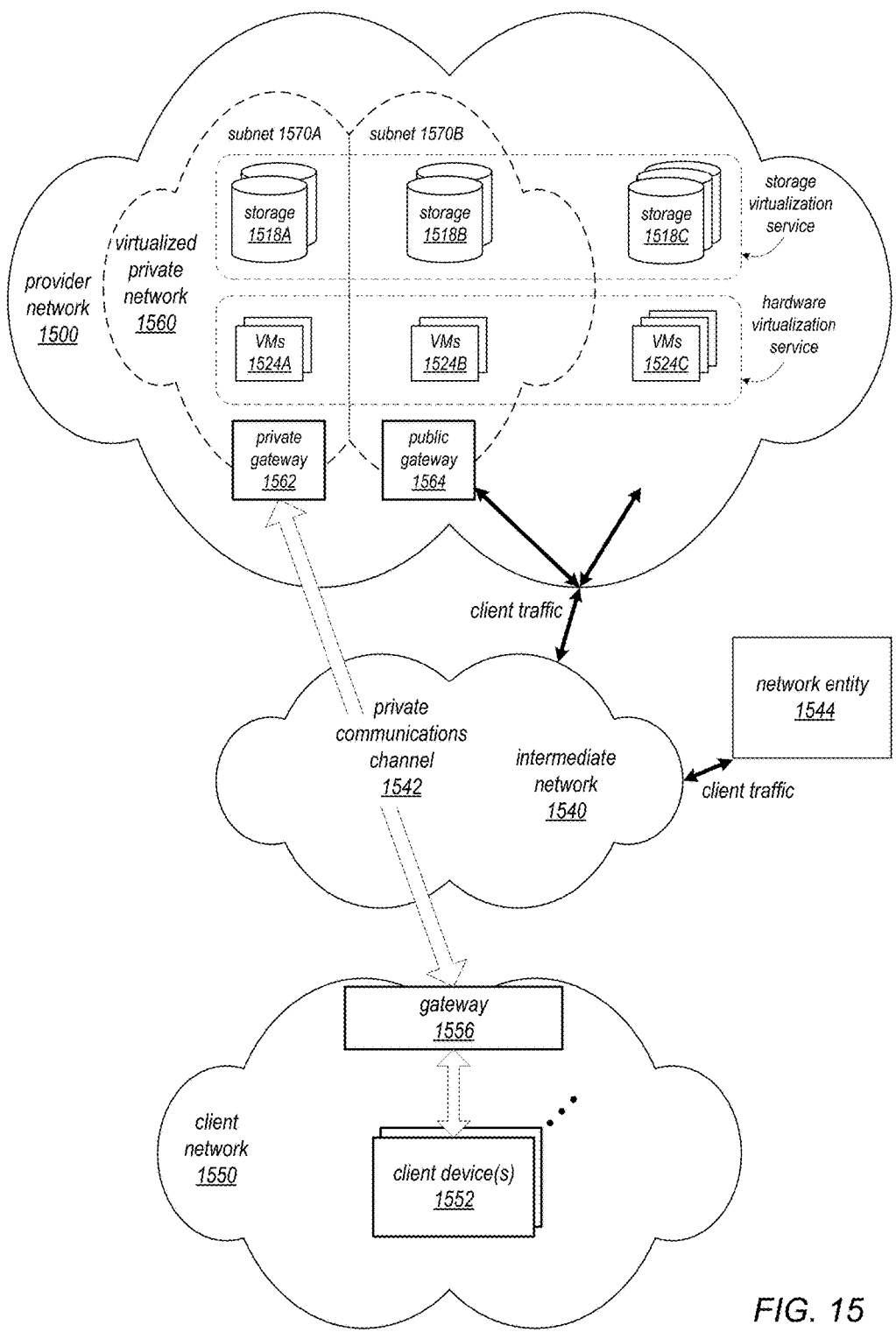
FIG. 15 illustrates an example provider network that provides virtualized private networks to at least some clients, according to at least some embodiments.

In at least some embodiments, at least some of the resources provided to clients of the service provider via the provider network 500 may be virtualized computing resources implemented on multi-tenant hardware that is shared with other client(s) and/or on hardware dedicated to the particular client. Each virtualized computing resource may be referred to as a resource instance or as a client resource instance (e.g., client resource instances 510). Resource instances 510 may, for example, be rented or leased to clients of the service provider. For example, clients of the service provider may access one or more services 506 of the provider network via API(s) 508 to the services 506 to obtain and configure resource instances 510 and to establish and manage virtual network configurations that include the resource instances 510, for example virtualized private networks as illustrated in FIG. 15. The resource instances 510 may, for example, be implemented according to hardware virtualization technology that enables multiple operating systems to run concurrently on a host computer, i.e. as virtual machines (VMs) on the hosts. A hypervisor, or virtual machine monitor (VMM), on a host presents the VMs on the host with a virtual platform and monitors the execution of the VMs. Each VM may be provided with one or more private IP addresses; the VMM on a host may be aware of the private IP addresses of the VMs on the host. Examples of the implementation and use of hardware virtualization technologies are further illustrated in FIG. 13 and described below.

In at least some embodiments, at least some of the resources provided to clients of the service provider via the provider network 500, virtualization service(s) 506, and API(s) 508, may be virtualized storage resources implemented on storage hardware on the provider network 500 that may be shared with other client(s). Virtualized data store technology may be used in various embodiments to provide different types of data storage and storage services for clients. For example, an object storage service may provide general, unstructured data object-based storage 520 to clients via which the clients may store and retrieve arbitrary types of data objects (some of which may include data files). As shown in FIG. 5, the unstructured object store 520 provided by the object storage service may, for example, be used to store data sets for distributed computing systems provisioned through the distributed computing service(s) 502. As another example, not shown in FIG. 5, a data storage service, for example a database service provided by the service provider or by some other entity, may provide a structured data model (e.g., a database model) to the clients for storing and retrieving structured data.

Figure 6:
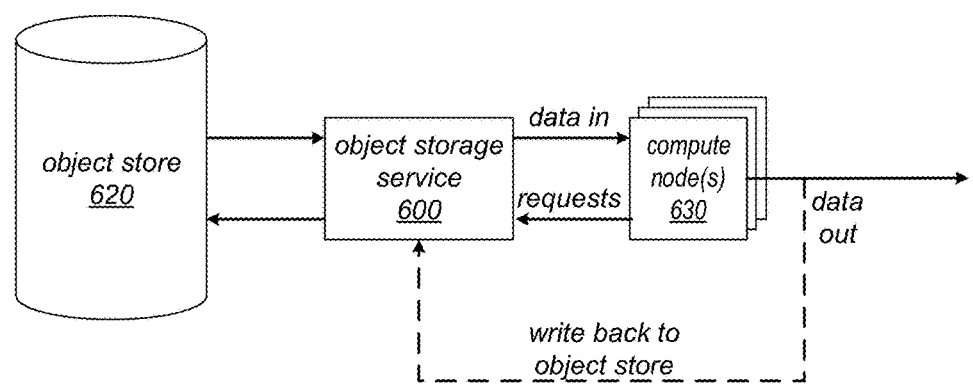
FIG. 6 illustrates an object storage service as illustrated in FIG. 4 used in a provider network environment as illustrated in FIG. 5 to provide storage for a distributed computing system, according to at least some embodiments.

FIG. 6 illustrates an object storage service as illustrated in FIG. 4 used in a provider network environment as illustrated in FIG. 5 to provide storage for a distributed computing system as virtualized storage on an object store. The distributed computing system may be implemented according to a distributed computing framework. As noted above, a non-limiting example of a framework for implementing such distributed computing systems is the Apache™ Hadoop® open source software library, which provides a framework that allows for the distributed processing of large data sets across clusters of compute nodes using simple programming models. As noted above, this framework provides an implementation of MapReduce, a programming model for processing large data sets with a parallel, distributed algorithm on a cluster. As previously noted, a MapReduce program may include a Map( ) procedure (sometimes referred to herein as a "mapper process" or a "mapper") that performs filtering and sorting and a Reduce( ) procedure (sometimes referred to herein as a "reducer process" or a "reducer") that performs a summary operation.

As illustrated in this example, the distributed computing system may include one or more compute nodes 630. The compute nodes 630 may be provisioned as client resource instances 510 as shown in FIG. 5, or alternatively may be provisioned as client devices 582 on a client network 580 or on clients 562 as shown in FIG. 5. A data set for the distributed computing system may be instantiated on object store 620. To process data from the data set, compute nodes 630 may access object store 620 via object storage service 600. In at least some embodiments, object storage service 600 may provide one or more one or more APIs via which the compute nodes 630 or other entities may access the object storage service 600. As illustrated in FIG. 6 by the dashed line, processed data (e.g., output data) may be, but is not necessarily, written back to object store 620. In some cases, at least some of the processed data that is written back to object store 620 may be accessed by compute node(s) 630. For example, a job (e.g., a MapReduce job) may read data from object storage service 600 and write output data to object storage service 600. A subsequent job (e.g., another MapReduce job) may then attempt to access at least some of the output data via object storage service 600.

An unstructured object store provided via an object storage service as illustrated in FIGS. 4 through 6 may have advantages, including, but not limited to, the ability to store very large data sets, high throughput, reliability and high availability due to features such as data replication, and flexibility. A client may leverage such an object storage service to easily, and relatively inexpensively, provision additional storage as needed without having to install and configure additional storage devices on the client's network. As noted above, an object storage service as illustrated in FIGS. 4 through 6, because of features such as data replication, may, in some embodiments, have the property of eventual consistency, in some embodiments. In other embodiments, it may implement a strong consistency model.

In at least some embodiments, each of the compute nodes 630 may include one or more processing modules that may implement processing portions of the distributed computing system (for example MapReduce procedures). A compute node 630 may also include one or more data access modules that access data storage service 600 to obtain metadata or access data objects (or data files) maintained in object store 620 by object storage service 600 on behalf of its processing module(s). In at least some embodiments, object storage service 600 may provide one or more APIs via which data access module(s) on compute nodes 630 may access the respective services.

As noted above, some customers of a computing services provider (e.g., a MapReduce service) may wish to execute MPI jobs (e.g., high-performance computing applications that perform large and/or complex computations) on MapReduce clusters. However, it may be difficult for these customers to configure a standard MapReduce cluster to support the execution of MPU jobs. For example, in order to run an MPI job, they may want to set up a secure MapReduce job flow in which all of the nodes (hosts) can communicate with each other. However, because a MapReduce cluster (e.g., one that is implemented on the Apache™ Hadoop® framework) is traditionally configured such that worker nodes only communicate with the master node, and not with each other (e.g., partitioning data to mapper, and then shuffling data from mappers to reducers), it may be non-trivial to configure the cluster such that MPI messages can be passed between arbitrary pairs of worker nodes. In various embodiments, the systems and methods described herein may be used to enable such node-to-node communication.

Another non-trivial issue that may need to be addressed in order to be able to execute an MPI job on a MapReduce cluster involve a change to the standard approach to managing the distribution of processes to various compute nodes (or CPU cores thereof). For example, a MapReduce cluster (e.g., one that is implemented on the Apache™ Hadoop® framework) is traditionally configured such that the framework spawns and distributes processes of a MapReduce job on behalf of the client. However, this approach may not be appropriate for spawning and distributing the processes of an MPI job. In various embodiments, the systems and methods described herein may be used to allow an MPI job running on a MapReduce cluster to control how its processes are distributed to the compute nodes of the cluster (and/or their CPU cores). As previously noted, this may include providing an interface through which an MPI job may be submitted as a single MapReduce step (e.g., one with only a single mapper process and no reducer process). The mapper process may then call an mpirun or mpiexec agent in order to launch the MPI job, when may then fork its own commands to all of the computing nodes (hosts) according to the MPI interface and protocols.

Figure 7:
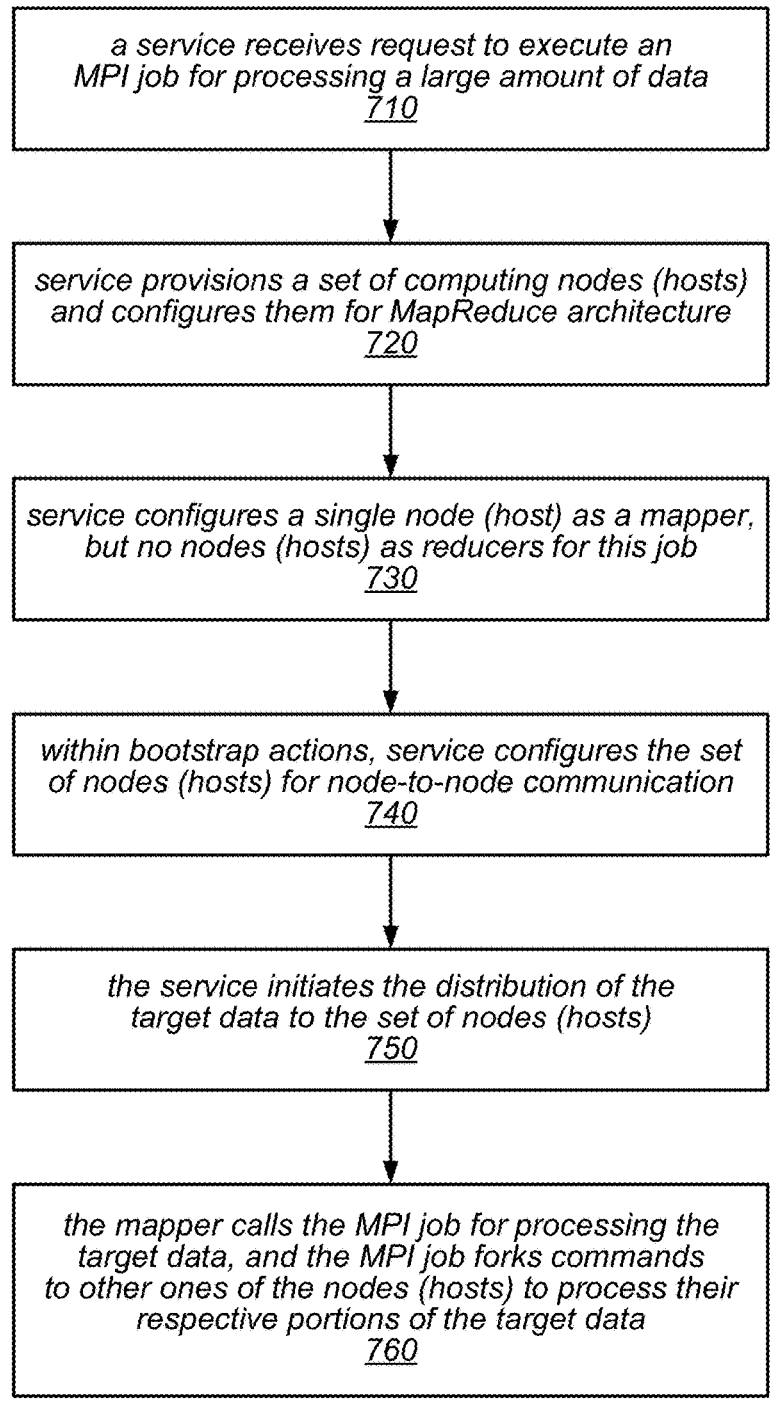
FIG. 7 is a flow diagram illustrating one embodiment of a method for executing an MPI application (or a computation thereof) on a MapReduce cluster.

One embodiment of a method for executing an MPI application (or a computation thereof) on a MapReduce cluster is illustrated by the flow diagram in FIG. 7. As illustrated at 710, in this example, the method may include a service receiving from a client (e.g., from a client application, customer, or service subscriber) a request to execute an MPI job for processing a large amount of data. In response to receiving the request, the method may include the service provisioning a set of computing nodes (hosts) and configuring them to implement a MapReduce architecture (e.g., if the client has not already created a MapReduce cluster for executing such jobs on their behalf), as in 720. In other words, the method may include the service configuring a collection of computing nodes as a cluster of computing nodes that collectively support the execution of applications under a MapReduce programming model.

As illustrated in this example, the method may include the service configuring a single node (host) as a mapper, but not configuring any nodes (hosts) as reducers for this particular job, as in 730. In this example, since there is only one mapper process, the MPI job may (at this point) appear to the MapReduce cluster as if it is a single process. The method may include (e.g., within one or more bootstrap actions), the service configuring the set of nodes (hosts) for node-to-node communication, as in 740. Example methods for configuring the set of nodes (hosts) for node-to-node communication are described in more detail below. The method may also include the service initiating the distribution of the target data for the MPI job to the set of nodes (hosts), as in 750. For example, as described below, the target data may be distributed only to nodes (hosts) in the MapReduce cluster that have been designated for use in executing the MPI job (e.g., by their inclusion in a hostfile for this MPI job).

As illustrated in FIG. 7, the method may include the mapper calling the MPI job in order to begin processing the target data, and the MPI job (which, at this point, is executing only on the node hosting the single mapper) may fork various ones of its commands to other ones of the nodes (hosts) instructing them to process their respective portions of the target data (as in 760) using MPI messages (according to an MPI interface for spawning processes). In some embodiments, these commands may be forked only to nodes (hosts) in the MapReduce cluster that have been designated for use in executing the MPI job (e.g., by their inclusion in a hostfile for this MPI job), resulting in processes being spawned on those nodes to process portions of the target data. Note that, in some embodiments, individual ones of these processes may be spawned to specific ones of multiple CPU cores on each node (host) and/or a specific number of these processes may be spawned to each node (host), e.g., as specified in a hostfile or other metadata for this MPI job.

As previously noted, in some embodiments of the systems described herein, in order to provide secure communications for MPI messaging (e.g., using a secure shell type protocol), a single pair of keys may be created and shared between all of the computing nodes of a MapReduce cluster. In some such embodiments, this key pair may be stored in an object data store (which may be maintained by an object storage service), and each of the worker hosts in the cluster may download and install the key pair (e.g., as part of a bootstrap action). In some embodiments, in order to avoid this key pair being leaked and compute nodes other than those in the cluster being able to access it, the MapReduce cluster may be created, configured, and operated within a virtual private cloud (e.g., on a virtual private network). In such embodiments, the cluster may be isolated from external traffic, such that the compute nodes (e.g., the worker nodes/hosts) will not accept public accesses (e.g., attempts to access the resources of the cluster and/or its associated key pair by nodes that are outside the cluster and/or that do not have an access role that gives them permission to access them). In some embodiments, within the bootstrap actions, after downloading the key pair for the cluster, the key pair may be added to a secure shell agent (e.g., an ssh-agent), which is configured to securely store the private and/or public keys of the key pair. An identifier of this agent may then be stored in a startup file (e.g., in a .bashrc file) so that subsequent MPI process can determine which process will handle the secure shell communication for pairs of nodes within the cluster. In some embodiments, the key pair for a cluster can only be downloaded from the object data store in which it was stored upon creation of the cluster by the compute nodes of that cluster. For example, the key pair may only be downloaded by compute nodes in the cluster that were created and configured with a particular access role that grants them permission to download the key pair.

Figure 8:
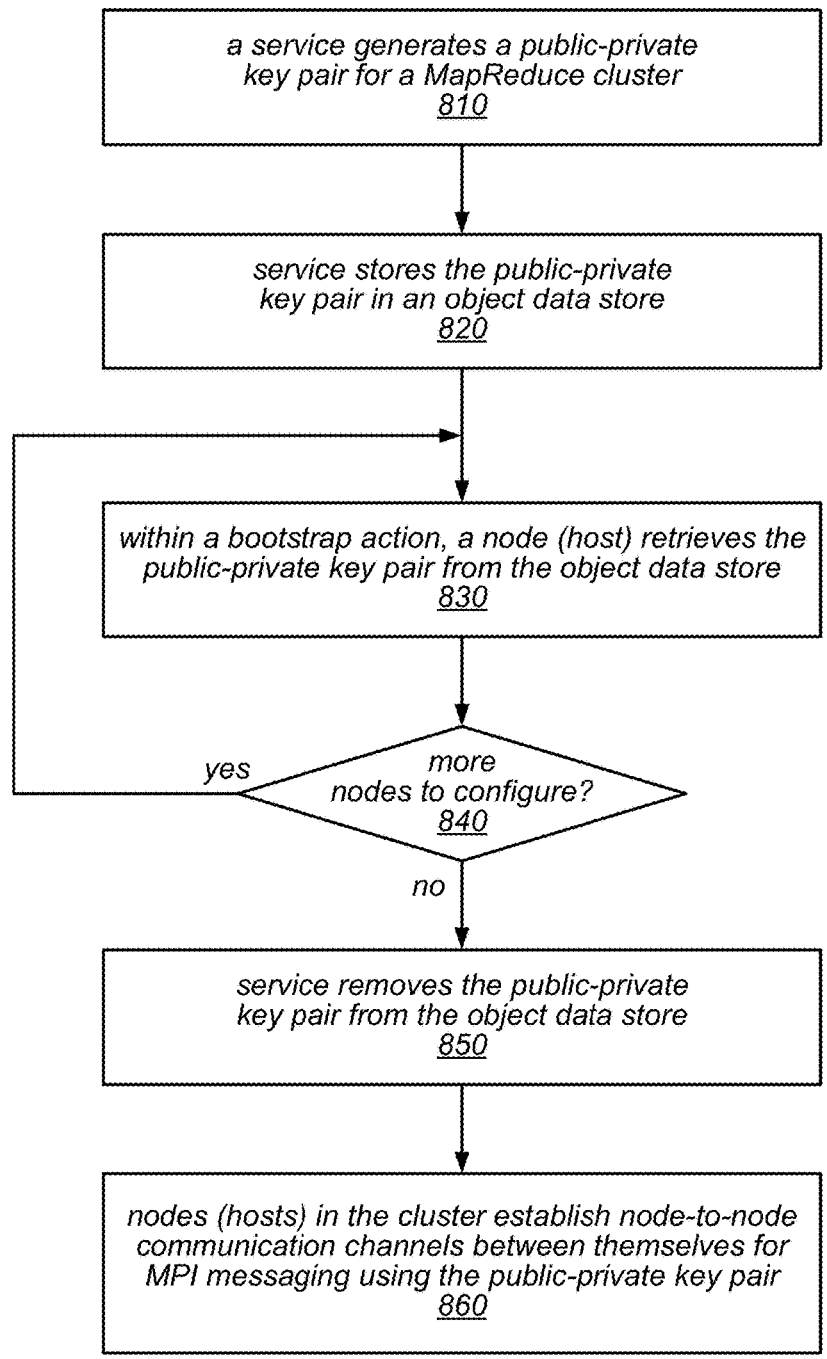
FIG. 8 is a flow diagram illustrating one embodiment of a method for configuring the compute nodes of a MapReduce cluster to support node-to-node communication for MPI applications.

One embodiment of a method for configuring the compute nodes of a MapReduce cluster to support node-to-node communication for MPI applications (or computations thereof) is illustrated by the flow diagram in FIG. 8. As illustrated in this example, the method may include a service generating a public-private key pair for a MapReduce cluster (as in 810), and the service storing the public-private key pair in and object data store (as in 820). The method may also include, within a bootstrap action, one of the nodes (hosts) of the MapReduce cluster retrieving the public-private key pair from the object data store, as in 830. As illustrated in FIG. 8, while there are more nodes of the MapReduce cluster to configure for node-to-node communication in support of an MPI job (shown as the positive exit from 840), the method may include repeating the operation illustrated at 830 for each of the other nodes of the MapReduce cluster.

As illustrated in FIG. 8, once all of the nodes of the MapReduce cluster have been configured for node-to-node communication (e.g., once the bootstrap actions have finished executing, shown as the negative exit from 840), the method may include the service removing the public-private key pair from the object data store (as in 850), and the nodes (hosts) in the MapReduce cluster establishing node-to-node communication channels between themselves for MPI messaging using the public-private key pair (as in 860), according to a secure shell protocol or another communication protocol. As described herein, the particular compute nodes on which the key pair is downloaded may include all of the compute nodes in a MapReduce cluster that was created on behalf of a client or may include only a subset of those compute nodes (e.g., those identified within a hostfile as being the nodes on which a particular computation will be executed), in different embodiments. Note also that, in some embodiments (e.g., in embodiments in which the application does not, itself, have the ability to download the key pair from the object data store, or is unaware of the existence of the key pair and/or its role in establishing the secure communication channels needed for enabling MPI messaging between the worker nodes of the MapReduce cluster), the key pair may be downloaded onto the appropriate compute nodes of the cluster by a separate MPI process (e.g., an MPI process other than the MPI process that will perform a parallel computation on behalf of a client).

In some embodiments, of the systems described herein, in order to be sure that the commands of an MPI job are forked to all of the appropriate compute nodes (hosts) in a MapReduce cluster, and not just to the CPU cores in the node that is configured as a mapper, the MPI job may make use of a hostfile and a rankfile, as defined by the MPI interface and protocols. In general, the hostfile may define which hosts can be used for an MPI job (e.g., it may include a list of the identifiers of the hosts that can be used), and this host information can be obtained from the metadata of the MapReduce job flow. For example, when a MapReduce cluster is created, it may include worker nodes, and as each worker node is brought up (e.g., as it becomes ready for operation through the execution of bootstrap actions or other configuration operations), it may inform the master node that it is ready, and may send its IP address to the master node. Note that, in some embodiments, the execution of the application by the worker nodes may not proceed until all of the worker nodes that are needed to execute the application have been brought up and configured for MPI messaging. For example, the master node may wait to initiate the processing of the target data set by the worker nodes until the number of worker compute nodes (or CPU cores thereof) that are ready for operation is equal to the number of processes specified in a request to execute the MPI job. The master node may then store this information for all the nodes in the cluster, i.e., a list of all the hosts in the cluster (one that includes identifiers of the hosts in the cluster, their IP addresses, etc.). The rankfile may further specify how the MPI process should be forked to the cores on all of the hosts that are identified in the hostfile. For example, the rankfile may indicate which hosts have which ranks in a given MPI process. As described in more detail below, the rankfile may be also used to synchronize multiple MPI processes executing on the same compute nodes (hosts). For example, as noted above, before executing a high-performance computing application (or a parallel computation thereof) using as an MPI job, other processes may be executed first (e.g., on each node) to download the appropriate data (which may be stored as data objects or files) to each of the compute nodes. Through the use of the rankfile, the MPI rank for each host can be fixed, such that the subsequently executed code of the high-performance computing application (or a parallel computation thereof) can access the correct input data.

As previously noted, in some embodiments, an MPI job may be submitted as a single MapReduce step (e.g., one with only a single mapper process and no reducer process). The mapper process may then call an mpirun or mpiexec agent in order to launch the MPI job and then fork its own commands to all of the computing nodes (hosts) according to the MPI interface and protocols. For example, the mapper process may obtain the hostfile (and/or other metadata for the MPI job and/or MapReduce cluster) and may call an mpirun or mpiexec agent to initialize an MPI environment on the MapReduce cluster and may begin spawning commands to the nodes identified in the hostfile for parallel processing of different portions of a target data set (e.g., using MPI messages, according to an MPI interface for spawning processes). In some embodiments, the call itself may include input parameters that specify the number of processes with which to execute the MPI job, the hostfile for the MPI job, and the rankfile for the MPI job.

As previously noted, a process (e.g., an MPI job) other than the MPI job that is to execute a high-performance computing application (or parallel computation thereof) may be used to download a portion of the target data (e.g., from an object data store) to each of the nodes that will collectively execute the application (or computation thereof). As further noted above, according to the MPI interface and protocols, each process in a group may be associated with an integer rank that is unique within the group. In some embodiments, the use of a rankfile may allow the MPI rank for each host (or CPU core) to be fixed. For example, a first computing node (or CPU core) may have an MPI rank of 0 in a first MPI process (e.g., an MPI process used to download target data to a given node) and also in a second MPI process (e.g., an MPI process used to process the data on the given node). In this example, the commands of the first MPI process that are executing on the computing node having an MPI rank of 0 may download the first portion of the target data, and the commands of the second MPI process that is executing on the computing node having an MPI rank of 0 may be configured to operate on the first portion of the target data. In this way, the two MPI processes may be synchronized such that the portion of the target data downloaded to a given node or CPU core (one that has a particular MPI rank) is the portion of the data that should be processed by the commands spawned to the given node or CPU core (e.g., commands that were spawned to the given node or CPU core based on its MPI rank). In some embodiments, using this approach, an MPI job performing a computation on a MapReduce cluster (or, more specifically, each host participating in the computation) will always know which portion of the target data it should download from the object data store, based on its fixed MPI rank.

Note that, without the use of a rankfile, a MapReduce cluster (or, more specifically, an MPI job running thereon) may distribute processes spawned by an MPI job that performs a high-performance computing application (or parallel computation thereof) inefficiently and/or in a manner that is inconsistent with a separate MPI job that distributes target data for the application (or computation) to the nodes of the cluster. In some MapReduce systems and/or some MPI applications, a default method of distributing submitted jobs may assign processes to the CPU cores on a first host (in turn) until it runs out of cores on the first host, and then may assign processes to the CPU cores on the next host. For example, in a cluster that includes four hosts, each of which includes four CPU cores, if four MPI jobs were submitted to the MapReduce cluster, they might all be assigned to the same host for execution (since a single host would appear to have enough capacity to execute all four). However, the use of a rankfile may allow the MPI jobs (and the processes that they spawn) to be distributed across multiple nodes as specified by the client in the rankfile and/or to synchronize them with each other, as appropriate. Note that, when using the systems and methods described herein for executing an MPI job on a MapReduce cluster, once the single mapper process launches the MPI job, the execution of the MPI job (including the distribution of data and commands to the worker nodes, and the aggregation and/or concatenation of the results) may be under the control of the MPI job, rather than under the control of the MapReduce framework on which it executes.

Figure 9:
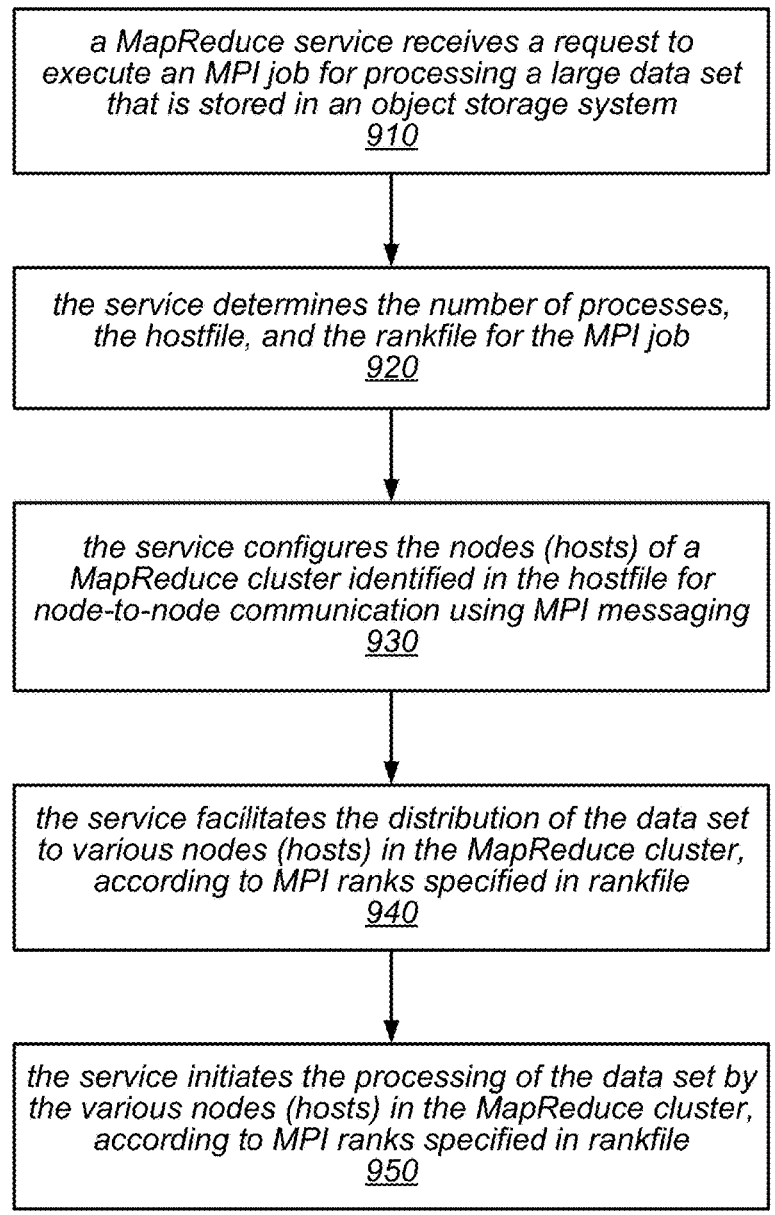
FIG. 9 is a flow diagram illustrating one embodiment of a method for utilizing a hostfile and rankfile when executing an MPI job on a MapReduce cluster.

One embodiment of a method for utilizing a hostfile and rankfile when executing an MPI job on a MapReduce cluster is illustrated by the flow diagram in FIG. 9. As illustrated at 910, in this example, the method may include a MapReduce service receiving a request to execute an MPI job for processing a large data set that is stored in an object storage system (e.g., for performing an HPC computation using MPI). The method may include the service determining the number of processes with which to execute the MPI job, the hostfile for the MPI job, and the rankfile for the MPI job, as in 920. For example, these determinations may be made based on inputs received from a client along with the MPI job request or may be made by the service automatically in response to receiving the request, in different embodiments. In some embodiments, this may include overriding the defaults of the MapReduce service based on inputs received via a service interface for submitting MPI jobs to the MapReduce service, rather than via a service interface for submitting standard MapReduce jobs.

As illustrated in this example, the method may include the service configuring the nodes (hosts) of a MapReduce cluster that are identified in the hostfile for node-to-node communication using MPI messaging (as in 930). For example, in some embodiments, configuring the nodes for node-to-node communication using MPI messaging may include performing bootstrap actions on each of the nodes to download a public-private key pair from the object storage system (e.g., when creating or configuring the MapReduce cluster) or causing the nodes of the cluster to carry out such bootstrap actions themselves (e.g., as part of the creating or configuring the cluster or subsequent to the creation and configuration of the cluster). As described below, the method may also include the service facilitating the distribution of the data set to various nodes (hosts) in the MapReduce cluster, according to the MPI ranks for each node (host) that are specified in rankfile (as in 940), and the service initiating the processing of the data set by the various nodes (hosts) in the MapReduce cluster according to the MPI ranks for each node (host) that are specified in the rankfile (as in 950).

Figure 10:
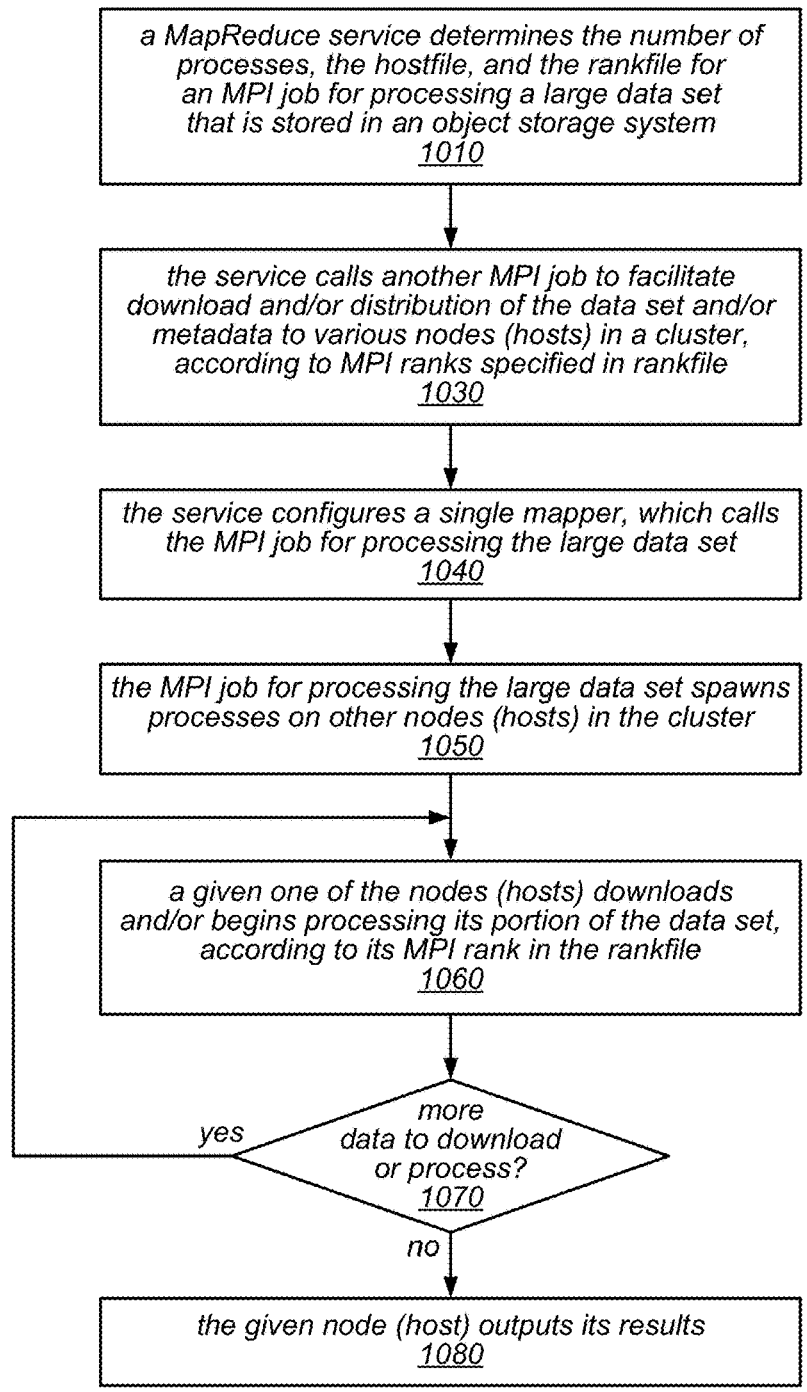
FIG. 10 is a flow diagram illustrating one embodiment of a method for synchronizing MPI jobs executing on a MapReduce cluster.

One embodiment of a method for synchronizing multiple MPI jobs executing on a MapReduce cluster is illustrated by the flow diagram in FIG. 10. In this example, it may be assumed that a MapReduce cluster has already been provisioned and configured for the use of a client (e.g., a client application, customer, or service subscriber) in executing MapReduce jobs and/or MPI jobs. As illustrated at 1010, the method may include a MapReduce service determining, for an MPI job for processing a large data set that is stored in an object storage system (e.g., an HPC computation), the number of processes with which to execute the MPI job, the hostfile for the MPI job, and the rankfile for the MPI job. As previously noted, such determinations may be made based on inputs received from a client along with the MPI job request or may be made by the service automatically in response to receiving the request, in different embodiments, and may result in overriding defaults of the MapReduce service that may typically be applied to standard MapReduce jobs.

As illustrated in FIG. 10, the method may include the service calling another MPI job to facilitate the download and/or distribution of the target data set and/or metadata associated with the MPI job to various nodes (hosts) in a MapReduce cluster, according to MPI ranks for each of the nodes (hosts) that are specified in the rankfile for the MPI job (as in 1030). This may include invoking bootstrap actions for downloading a key pair that was generated for the MapReduce cluster to each of the nodes in order to facilitate node-to-node communication using MPI. In some embodiments, commands of this MPI job may be spawned to the nodes in the MapReduce cluster (e.g., using MPI messages, according to an MPI interface for spawning processes) that may cause each node to download its portion of the target data set from the object storage system (e.g., as identified by the MPI rank of the node on which it will be processed).

Note that in some embodiments, not all of the data that each node will eventually process will be downloaded at once, but may be downloaded on an as-needed basis by each node as execution of the HPC computation progresses. In such embodiments, this MPI job may continue to run and to spawn commands to various nodes to initiate the downloading of additional data if and when it is needed, where, again, the data to be downloaded may be identified according to the MPI rank of the node on which it will be processed.

As illustrated in this example, the method may also include the service configuring a single mapper, which may call the MPI job for processing the large data set (as in 1040). The method may also include the MPI job for processing the large data set spawning processes on other nodes (hosts) in the cluster (as in 1050). As illustrated in FIG. 10, the method may include a given one of the nodes (hosts) downloading and/or beginning to process its portion of the data set, according to the MPI rank for the given node that is specified in the rankfile (as in 1060). In other words, the MPI ranks for each of the nodes may be fixed, such that the MPI job that facilitates the downloaded of data and metadata and the MPI job that processes data will be synchronized (i.e., such that the portion of the data set that is downloaded to each node is the portion of the data set that the portion of the HPC computation being performed on that node should process). As noted in other examples, processing the data set (or a portion thereof) may include exchanging MPI messages (e.g., various send/receive operations, synchronization operations, data movement operations, and/or reduction operations) with other ones of the nodes (hosts) of the cluster.

While there is still more data in the data set to be downloaded and/or processed by the given node (shown as the positive exit from 1070), the method may include repeating the operations illustrated at 1060 (shown as the feedback from the positive exit of 1070 to 1060). Once there is there is no additional data in the data set to be downloaded or processed by the given node (shown as the negative exit from 1070), the method may include the given node (host) outputting its results (as in 1080). Note that in some embodiments, each of the nodes (hosts) may perform the operations shown in elements 1060-1080 of FIG. 10 at the same time (e.g., substantially in parallel or in largely overlapping time periods).

In some embodiments, there may not be separate interfaces for submitting MapReduce jobs and MPI jobs to the framework or to the MapReduce cluster. For example, in some embodiments, each of the MPI commands of an MPI job submitted by a client may be used as a streaming command in an Apache™ Hadoop® framework that implements a MapReduce service, and the MPI job may be paused as the commands are streaming so that the job can be launched in a MapReduce cluster (as if it were a MapReduce job). In such embodiments, there may not be a specific API that is exposed to clients for running MPI jobs, and clients (e.g., customers or service subscribers) may not need to manually log into any computing node to submit their MPI jobs. Instead, this may be entirely automated at the streaming interface of the framework. As the client pushes MPI commands to a streaming job, the MapReduce service (or MapReduce cluster thereof) may take each step and execute it, in turn.

In some embodiments, an Apache™ Hadoop® framework may implement a MapReduce service and may also implement an MPI service that runs MPI jobs on MapReduce clusters on behalf of clients. In such embodiments, APIs for the MPI service that are called by clients may indicate whether or not an MPI job should be run. If an MPI job should be run, the necessary setup to run an MPI job on a MapReduce cluster may be performed by the framework (e.g., by submitting the appropriate bootstrap action to the MapReduce service or to a MapReduce cluster thereof on behalf of the client, and then launching the MPI job on a single mapper).

Figure 11:
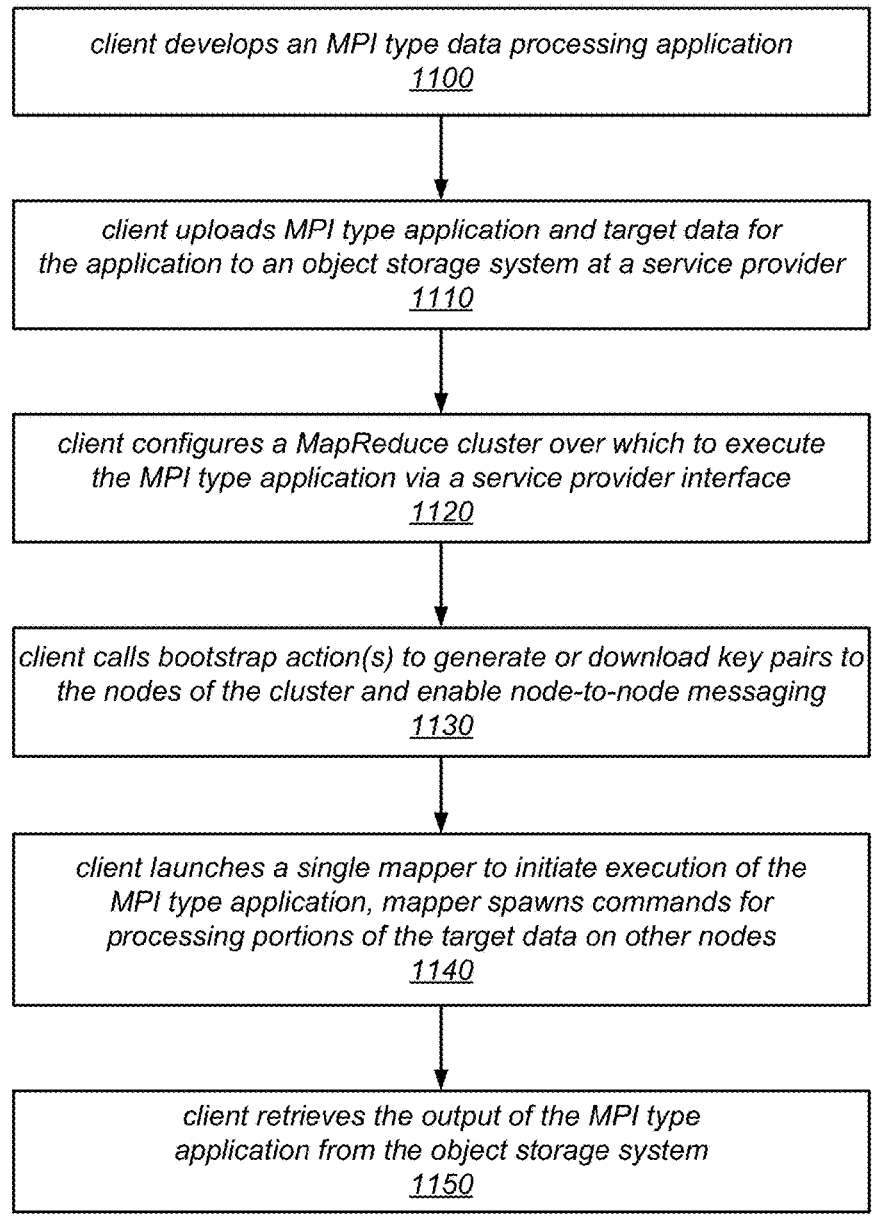
FIG. 11 is a flow diagram illustrating one embodiment of a method for a client to direct the execution of an MPI job on a MapReduce cluster.

In some embodiments, clients may be made aware of bootstrap actions usable to configure a MapReduce cluster for running an MPI job. In such embodiments, in order to execute an MPI job on a MapReduce cluster, a client may be able to directly make a call into the MapReduce service or to a MapReduce cluster thereof to run the appropriate bootstrap action (e.g., an bootstrap action for configuring the worker nodes of the cluster for secure node-to-node communication using a key pair that was generated for the cluster) and to launch the MPI job on a single mapper (as described herein). In other words, in some embodiments, the techniques described herein for running MPI jobs on MapReduce clusters may employ service interface in which (in response to submission of an MPI job) appropriate bootstrap actions or other configuration operations may be performed automatically on behalf of the client, while in other embodiments clients may be able to invoke the appropriate bootstrap actions or other configuration operations without needing to include a separate interface for submitting MPI jobs One embodiment of a method for a client to direct the execution of an MPI job on a MapReduce cluster is illustrated by the flow diagram in FIG. 11. As illustrated in this example, the method may include a client developing an MPI type data processing application (as in 1100) and uploading the MPI type application and target data for the application to an object storage system at a service provider (as in 1110). For example, the service provider may provide a MapReduce service and may expose APIs of the MapReduce service that allow clients to configure the underlying resources, invoke bootstrap actions, submit an MPI application and its target data, and/or initiate the execution of the application. The method may include the client configuring a MapReduce cluster over which to execute the MPI type application via the service provider interface (as in 1120) and the client calling one or more bootstrap actions to generate or download key pairs to the nodes of the MapReduce cluster and/or to enable or establish communication channels for node-to-node messaging (according to a defined message passing interface and associated protocols for establishing communication channels), as in 1130.

As illustrated in this example, the method may include the client launching a single mapper process on the cluster (e.g., on a single node of the cluster) to initiate the execution of the MPI type application, and the mapper process spawning commands for processing portions of the target data on other ones of the nodes of the cluster (as in 1140). As previously noted, processing the target data (or portions thereof) may include various nodes of the cluster exchanging MPI messages (e.g., various send/receive operations, synchronization operations, data movement operations, and/or reduction operations) with each other. When processing is complete (or at various intermediate points during processing), the method may include the client retrieving the output of the MPI type application from the object storage system (as in 1150).

As noted above, in some embodiments the systems described herein may employ a separate MPI application to download the target data for an MPI job and may synchronize all the hosts (and CPU cores thereof) for the two MPI jobs using a rankfile. In other embodiments, rather than each node in a MapReduce cluster downloading its portion of the target data from an object data store, there may be a block storage volume that each node in the cluster can access. For example, the master node of a MapReduce cluster may attach to such a volume and then it may be shared via the Network File System protocol (NFS) from the master nodes to the other nodes in the cluster.

In at least some embodiments, the data store described herein may be an implementation of the Hadoop® FileSystem API built on an unstructured object storage service. Note also that while many embodiments of techniques for running MPI jobs are described herein in terms of the MPI jobs running on specific implementations of MapReduce systems and services built on the Apache™ Hadoop® framework, these techniques may be applied in order to run MPI jobs on other implementations of MapReduce or on other types of distributed computing frameworks that include master compute nodes and worker (i.e., slave) compute nodes. For example, the techniques described herein for establishing secure communication channels between worker nodes (e.g., using a unique, cluster-specific key pair that is stored in an object data store, such as the object data store illustrated in FIG. 4 and described herein) may be suitable for implementation in any distributed computing system in which worker compute nodes do not have access to a shared network file system from which such a key pair can be obtained in real time. Note also that while many of the embodiments described herein are directed to running jobs that employ the MPI message passing interface standards and protocols, the techniques described herein may also be applied in order to run jobs that employ other message passing interfaces to coordinate the execution of a high-performance computing application (or parallel computations thereof) on multiple compute nodes in a distributed computing system (e.g., a MapReduce system or another type of distributed computing system).

In some embodiments, at least some of the metadata, data items and/or objects described herein may be stored on Solid State Drives (SSDs). In some embodiments, at least some of the metadata, data items and/or objects may be replicated, for example across three locations, for high availability and durability.

Example Provider Network Environments

This section describes example provider network environments in which embodiments of the methods and apparatus described herein (e.g., those employed in executing MPI applications on a MapReduce cluster) may be implemented. However, these example provider network environments are not intended to be limiting.

Figure 12:
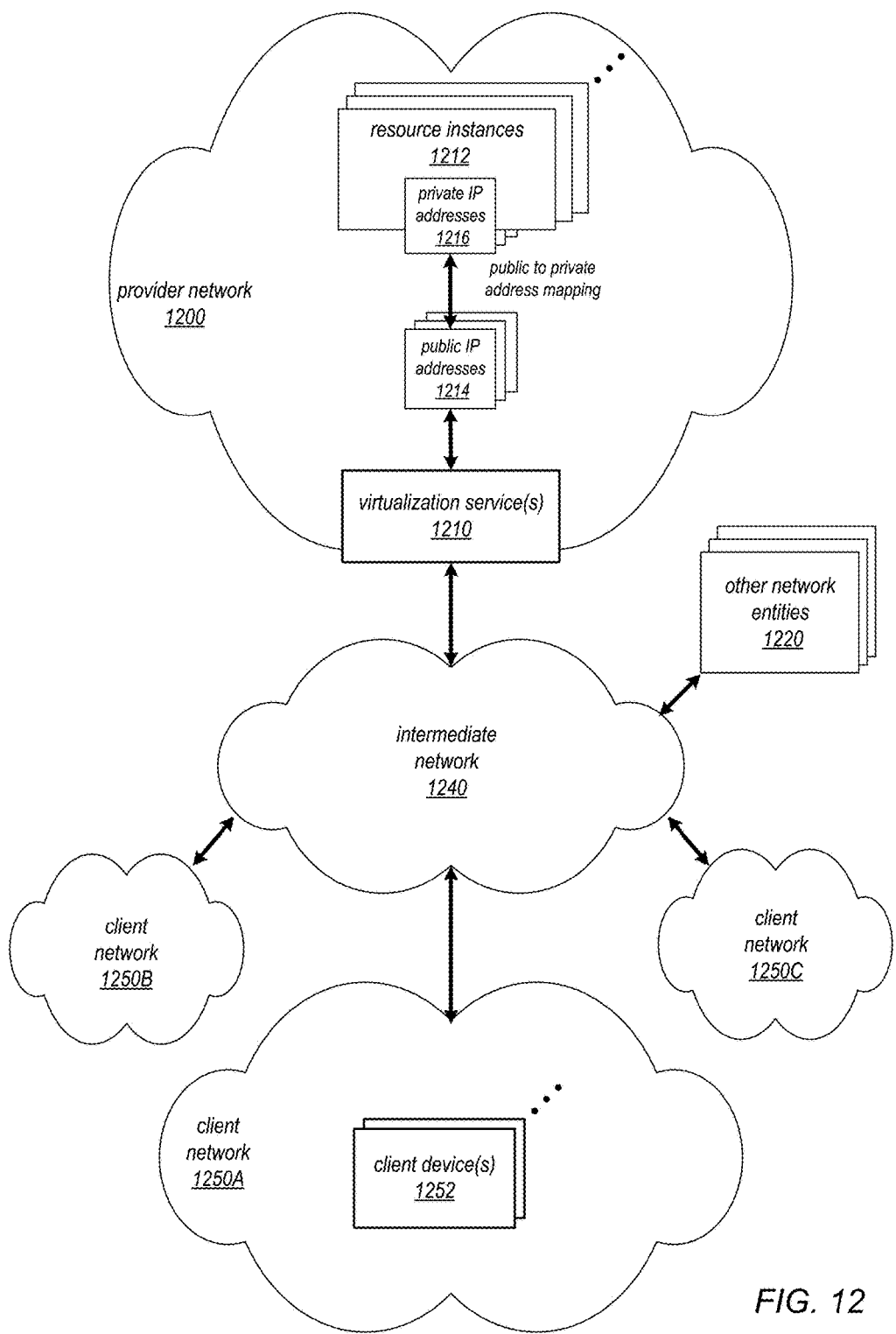
FIG. 12 illustrates an example provider network environment, according to at least some embodiments.

FIG. 12 illustrates an example provider network environment, according to at least some embodiments. A provider network 1200 may provide resource virtualization to clients via one or more virtualization services 1210 that allow clients to purchase, rent, or otherwise obtain instances 1212 of virtualized resources, including but not limited to computation and storage resources, implemented on devices within the provider network or networks in one or more data centers. Private IP addresses 1216 may be associated with the resource instances 1212; the private IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that clients may obtain from the provider 1200.

Conventionally, the provider network 1200, via the virtualization services 1210, may allow a client of the service provider (e.g., a client that operates client network 1250A) to dynamically associate at least some public IP addresses 1214 assigned or allocated to the client with particular resource instances 1212 assigned to the client. The provider network 1200 may also allow the client to remap a public IP address 1214, previously mapped to one virtualized computing resource instance 1212 allocated to the client, to another virtualized computing resource instance 1212 that is also allocated to the client. Using the virtualized computing resource instances 1212 and public IP addresses 1214 provided by the service provider, a client of the service provider such as the operator of client network 1250A may, for example, implement client-specific applications and present the client's applications on an intermediate network 1240, such as the Internet. Other network entities 1220 on the intermediate network 1240 may then generate traffic to a destination public IP address 1214 published by the client network 1250A; the traffic is routed to the service provider data center, and at the data center is routed, via a network substrate, to the private IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 1200; a client may then assign their allocated public IP addresses to particular resource instances allocated to the client. These public IP addresses may be referred to as client public IP addresses, or simply client IP addresses. Instead of being assigned by the provider network 1200 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 13:
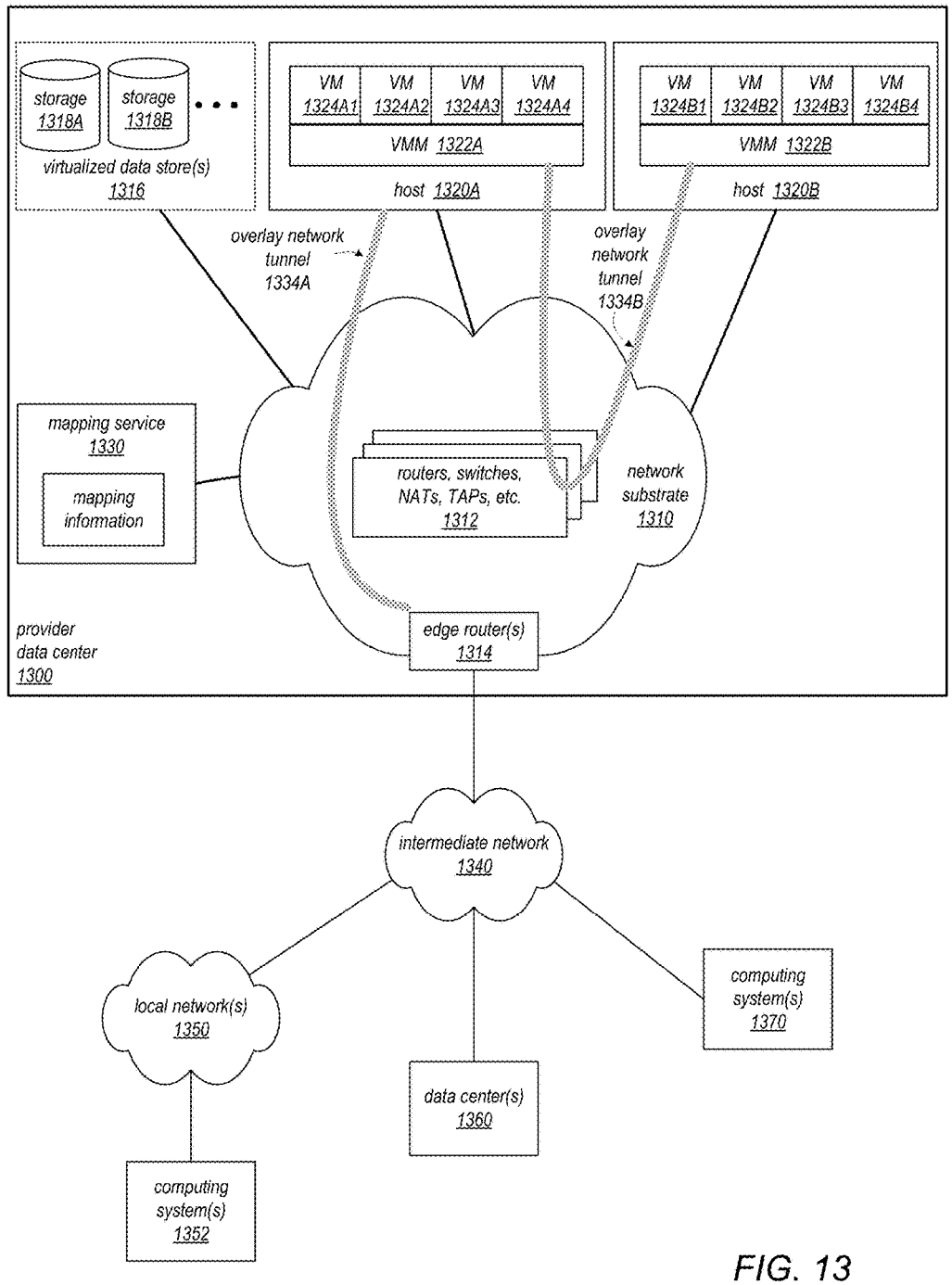
FIG. 13 illustrates an example data center that implements an overlay network on a network substrate using IP tunneling technology, according to some embodiments.

FIG. 13 illustrates an example data center that implements an overlay network on a network substrate using IP tunneling technology, according to at least some embodiments. A provider data center 1300 may include a network substrate that includes networking devices 1312 such as routers, switches, network address translators (NATs), and so on. At least some embodiments may employ an Internet Protocol (IP) tunneling technology to provide an overlay network via which encapsulated packets may be passed through network substrate 1310 using tunnels. The IP tunneling technology may provide a mapping and encapsulating system for creating an overlay network on a network (e.g., a local network in data center 1300 of FIG. 13) and may provide a separate namespace for the overlay layer (the public IP addresses) and the network substrate 1310 layer (the private IP addresses). Packets in the overlay layer may be checked against a mapping directory (e.g., provided by mapping service 1330) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1330) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 13, an example overlay network tunnel 1334A from a virtual machine (VM) 1324A on host 1320A to a device on the intermediate network 1340 (through edge router 1314) and an example overlay network tunnel 1334B between a VM 1324B on host 1320B and a VM 1324C on host 1320C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses. In some embodiments, an IP tunneling technology such as that illustrated in FIG. 13 may be employed when passing messages between processes of an MPI application executing on a MapReduce cluster. For example, the overlay network tunnel 1334B between VM 1324B on host 1320B and VM 1324C on host 1320C may represent a communication channel over which these two hosts (when acting as worker nodes) exchange messages while working together (along with other hosts) to execute an MPI job on a MapReduce cluster, or may represent a communication channel over which a master node and a worker node communicate with each other while executing a MaprReduce job or an MPI job. In another example, the overlay network tunnel 1334A from VM 1324A on host 1320A to a device on the intermediate network 1340 (through edge router 1314) may represent a communication channel over which a master node and a worker node communicate with each other when executing a MaprReduce job or an MPI job (e.g., in an embodiment in which the master node and at least some of the worker nodes are located in different data centers).

Referring to FIG. 13, at least some networks in which embodiments may be implemented may include hardware virtualization technology that enables multiple operating systems to run concurrently on a host computer (e.g., hosts 1320A and 1320B of FIG. 13), i.e. as virtual machines (VMs) 1324 on the hosts 1320. The VMs 1324 may, for example, be rented or leased to clients of a network provider. A hypervisor, or virtual machine monitor (VMM) 1322, on a host 1320 presents the VMs 1324 on the host with a virtual platform and monitors the execution of the VMs 1324. Each VM 1324 may be provided with one or more private IP addresses; the VMM 1322 on a host 1320 may be aware of the private IP addresses of the VMs 1324 on the host. A mapping service 1330 may be aware of all network IP prefixes and the IP addresses of routers or other devices serving IP addresses on the local network. This includes the IP addresses of the VMMs 1322 serving multiple VMs 1324. The mapping service 1330 may be centralized, for example on a server system, or alternatively may be distributed among two or more server systems or other devices on the network. A network may, for example, use the mapping service technology and IP tunneling technology to, for example, route data packets between VMs 1324 on different hosts 1320 within the data center 1300 network; note that an interior gateway protocol (IGP) may be used to exchange routing information within such a local network.

In addition, a network such as the provider data center 1300 network (which is sometimes referred to as an autonomous system (AS)) may use the mapping service technology, IP tunneling technology, and routing service technology to route packets from the VMs 1324 to Internet destinations, and from Internet sources to the VMs 1324. Note that an external gateway protocol (EGP) or border gateway protocol (BGP) is typically used for Internet routing between sources and destinations on the Internet. FIG. 13 shows an example provider data center 1300 implementing a network that provides resource virtualization technology and that provides full Internet access via edge router(s) 1314 that connect to Internet transit providers, according to at least some embodiments. The provider data center 1300 may, for example, provide clients the ability to implement virtual computing systems (VMs) 1324 via a hardware virtualization service and the ability to implement virtualized data stores 1316 on storage resources 1318 via a storage virtualization service.

The data center 1300 network may implement IP tunneling technology, mapping service technology, and a routing service technology to route traffic to and from virtualized resources, for example to route packets from the VMs 1324 on hosts 1320 in data center 1300 to Internet destinations, and from Internet sources to the VMs 1324. Internet sources and destinations may, for example, include computing systems 1370 connected to the intermediate network 1340 and computing systems 1352 connected to local networks 1350 that connect to the intermediate network 1340 (e.g., via edge router(s) 1314 that connect the network 1350 to Internet transit providers). The provider data center 1300 network may also route packets between resources in data center 1300, for example from a VM 1324 on a host 1320 in data center 1300 to other VMs 1324 on the same host or on other hosts 1320 in data center 1300.

A service provider that provides data center 1300 may also provide additional data center(s) 1360 that include hardware virtualization technology similar to data center 1300 and that may also be connected to intermediate network 1340. Packets may be forwarded from data center 1300 to other data centers 1360, for example from a VM 1324 on a host 1320 in data center 1300 to another VM on another host in another, similar data center 1360, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1318, as virtualized resources to clients of a network provider in a similar manner.

Figure 14:
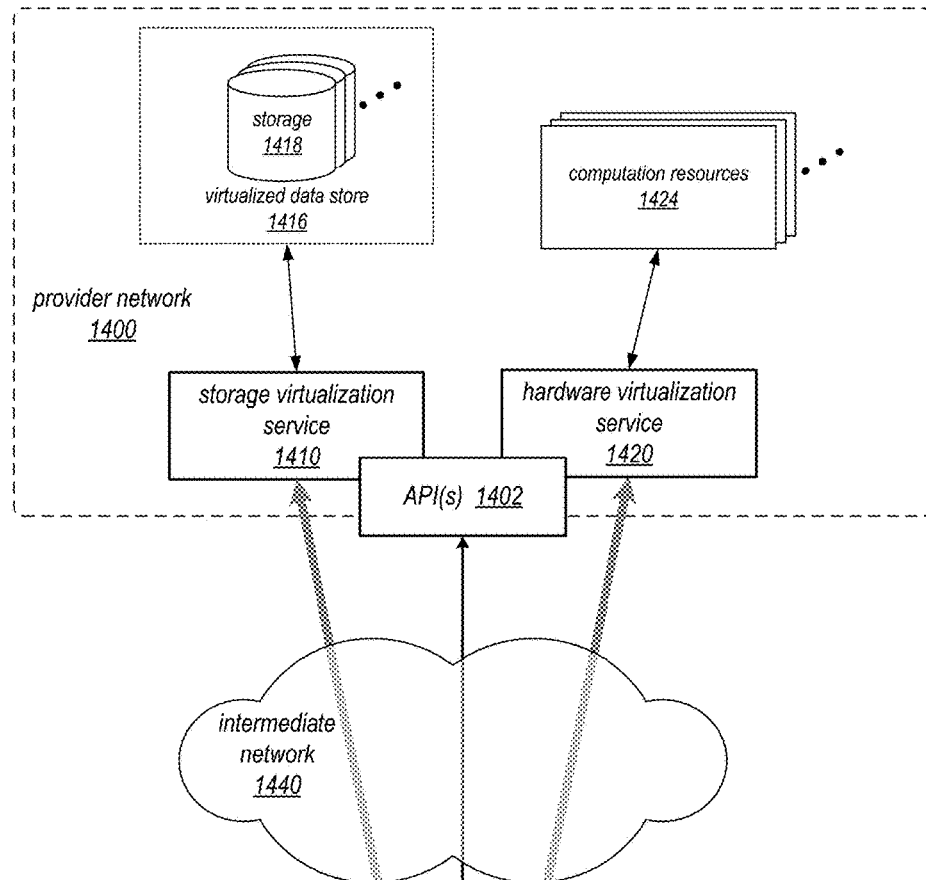
FIG. 14 is a block diagram of an example provider network that provides a storage virtualization service and a hardware virtualization service to clients, according to at least some embodiments.
Figure 14:
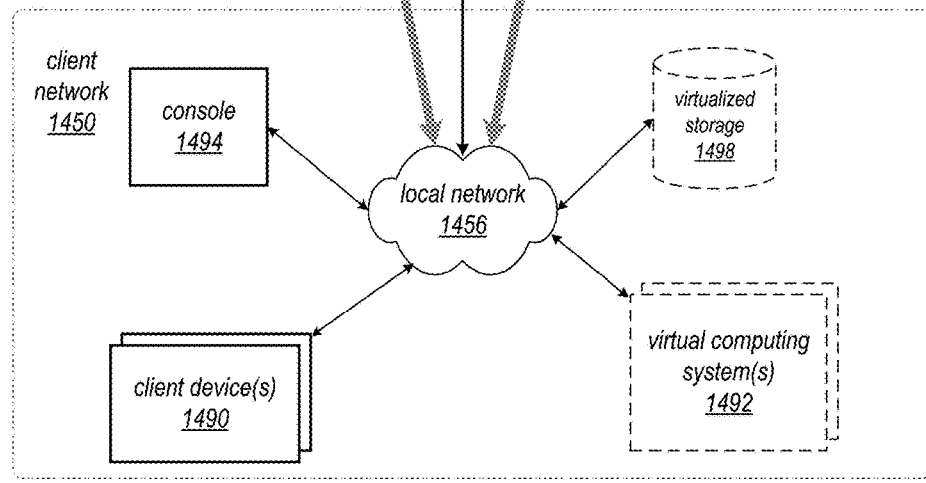

FIG. 14 is a block diagram of an example provider network that provides a storage virtualization service and a hardware virtualization service to clients, according to at least some embodiments. Hardware virtualization service 1420 provides multiple computation resources 1424 (e.g., VMs) to clients. The computation resources 1424 may, for example, be rented or leased to clients of the provider network 1400 (e.g., to a client that implements client network 1450). Each computation resource 1424 may be provided with one or more private IP addresses. Provider network 1400 may be configured to route packets from the private IP addresses of the computation resources 1424 to public Internet destinations, and from public Internet sources to the computation resources 1424.

Provider network 1400 may provide a client network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a client network 1450 may access functionality provided by the hardware virtualization service 1420, for example via a console 1494. In at least some embodiments, at the provider network 1400, each virtual computing system 1492 at client network 1450 may correspond to a computation resource 1424 that is leased, rented, or otherwise provided to client network 1450.

From an instance of a virtual computing system 1492 and/or another client device 1490 or console 1494, the client may access the functionality of storage virtualization service 1410, for example via one or more APIs 1402, to access data from and store data to a virtualized data store 1416 provided by the provider network 1400. In some embodiments, a virtualized data store gateway (not shown) may be provided at the client network 1450 that may locally cache at least some data, for example frequently accessed or critical data, and that may communicate with virtualized data store service 1410 via one or more communications channels to upload new or modified data from a local cache so that the primary store of data (virtualized data store 1416) is maintained. In at least some embodiments, a user, via a virtual computing system 1492 and/or on another client device 1490, may mount and access virtualized data store 1416 volumes, which appear to the user as local virtualized storage 1498. Note that, in various embodiments, storage 1418 of virtualized data store 1416 may include object storage, block-based storage and/or volume-based storage.

While not shown in FIG. 14, the virtualization service(s) may also be accessed from resource instances within the provider network 1400 via API(s) 1402. For example, a client, appliance service provider, or other entity may access a virtualization service from within a respective private network on the provider network 1400 via an API 1402 to request allocation of one or more resource instances within the private network or within another private network.

FIG. 15 illustrates an example provider network that provides private networks on the provider network to at least some clients, according to at least some embodiments. A client's virtualized private network 1560 on a provider network 1500, for example, enables a client to connect their existing infrastructure (e.g., devices 1552) on client network 1550 to a set of logically isolated resource instances (e.g., VMs 1524A and 1524B and storage 1518A and 1518B), and to extend management capabilities such as security services, firewalls, and intrusion detection systems to include their resource instances.

A client's virtualized private network 1560 may be connected to a client network 1550 via a private communications channel 1542. A private communications channel 1542 may, for example, be a tunnel implemented according to a network tunneling technology or some other peering connection over an intermediate network 1540. The intermediate network may, for example, be a shared network or a public network such as the Internet. Alternatively, a private communications channel 1542 may be implemented over a direct, dedicated connection between virtualized private network 1560 and client network 1550.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1560 for a client on provider network 1500, one or more resource instances (e.g., VMs 1524A and 1524B and storage 1518A and 1518B) may be allocated to the virtualized private network 1560. Note that other resource instances (e.g., storage 1518C and VMs 1524C) may remain available on the provider network 1500 for other client usage. A range of public IP addresses may also be allocated to the virtualized private network 1560. In addition, one or more networking devices (routers, switches, etc.) of the provider network 1500 may be allocated to the virtualized private network 1560. A private communications channel 1542 may be established between a private gateway 1562 at virtualized private network 1560 and a gateway 1556 at client network 1550.

In at least some embodiments, in addition to, or instead of, a private gateway 1562, virtualized private network 1560 may include a public gateway 1564 that enables resources within virtualized private network 1560 to communicate directly with entities (e.g., network entity 1544) via intermediate network 1540, and vice versa, instead of or in addition to via private communications channel 1542.

Virtualized private network 1560 may be, but is not necessarily, subdivided into two or more subnets 1570. For example, in implementations that include both a private gateway 1562 and a public gateway 1564, the private network may be subdivided into a subnet 1570A that includes resources (VMs 1524A and storage 1518A, in this example) reachable through private gateway 1562, and a subnet 1570B that includes resources (VMs 1524B and storage 1518B, in this example) reachable through public gateway 1564.

The client may assign particular client public IP addresses to particular resource instances in virtualized private network 1560. A network entity 1544 on intermediate network 1540 may then send traffic to a public IP address published by the client; the traffic is routed, by the provider network 1500, to the associated resource instance. Return traffic from the resource instance is routed, by the provider network 1500, back to the network entity 1544 over intermediate network 1540. Note that routing traffic between a resource instance and a network entity 1544 may require network address translation to translate between the public IP address and the private IP address of the resource instance.

At least some embodiments may allow a client to remap public IP addresses in a client's virtualized private network 1560 as illustrated in FIG. 15 to devices on the client's external network 1550. When a packet is received (e.g., from network entity 1544), the network 1500 may determine that the destination IP address indicated by the packet has been remapped to an endpoint on external network 1550 and handle routing of the packet to the respective endpoint, either via private communications channel 1542 or via the intermediate network 1540. Response traffic may be routed from the endpoint to the network entity 1544 through the provider network 1500, or alternatively may be directly routed to the network entity 1544 by the client network 1550. From the perspective of the network entity 1544, it appears as if the network entity 1544 is communicating with the public IP address of the client on the provider network 1500. However, the network entity 1544 has actually communicated with the endpoint on client network 1550.

While FIG. 15 shows network entity 1544 on intermediate network 1540 and external to provider network 1500, a network entity may be an entity on provider network 1500. For example, one of the resource instances provided by provider network 1500 may be a network entity that sends traffic to a public IP address published by the client.

Illustrative System

Figure 16:
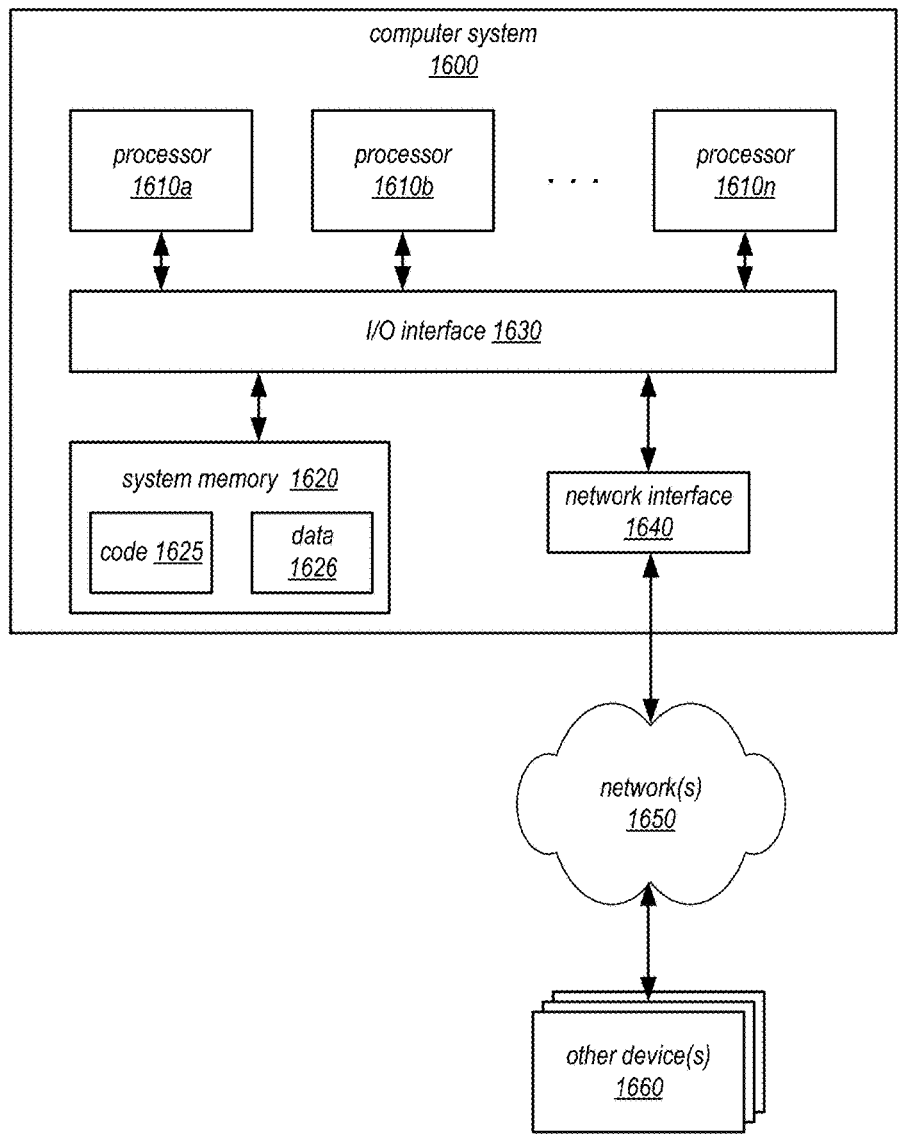
FIG. 16 is a block diagram illustrating an example computer system that may be used in some embodiments.

In at least some embodiments, a computing environment that implements a portion or all of the methods and apparatus described herein may include a general-purpose computer system that includes or is configured to access one or more computer-accessible media, such as computer system 1600 illustrated in FIG. 16. For example, in various embodiments, computer system 1600 may represent a master node or worker node of a distributed computation system (e.g., a MapReduce cluster), a node of an object storage service, a client computing system, or any other type of computer system that may be employed to implement the methods and apparatus described herein. In the illustrated embodiment, computer system 1600 includes one or more processors 1610 coupled to a system memory 1620 via an input/output (I/O) interface 1630. Computer system 1600 further includes a network interface 1640 coupled to I/O interface 1630.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store instructions and data accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the methods and apparatus described herein, are shown stored within system memory 1620 as code 1625 and data 1626. For example, at various times, data 1626 in system memory 1620 may include one or more of a data set (or portion thereof) that is to processed by a MapReduce application or MPI application, output data that is produced by such an application, key pairs, hostfiles, rankfiles, or configuration or operating parameters for a MapReduce job or an MPI job, or any other information usable when executing such applications. In another example, at various times, code 1625 in system memory 1620 may include program instructions that are executable to implement a MapReduce application or MPI application (or any portion thereof), an operating system or virtual machine monitor, library or utility functions, an API or service interface, or any other program instructions that are executable to perform the methods described herein.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems (e.g., computer systems similar to computer system 1600 or computer systems that include more, fewer, or different components than computer system 1600) or devices as illustrated and described in FIGS. 1 through 15, for example. For example, in some embodiments, computer system 1600 may represent a node of a MapReduce cluster, and network interface 1640 may be configured to allow data to be exchanged between computer system 1600 and devices that implement an object data storage service. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be one embodiment of a computer-accessible medium configured to store program instructions and data as described above for FIGS. 1 through 15 for implementing embodiments of methods and apparatus as described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed computing system, comprising:
   a plurality of compute nodes, each compute node comprising at least one processor and a memory;

a data store that stores data objects of a data set, wherein the data store is accessible by the plurality of compute nodes; and a service interface;

wherein the distributed computing system implements a distributed computing service;

wherein the service interface is configured to receive a request to execute an application that processes the data set and that implements a message passing interface through which compute nodes participating in execution of the application exchange messages with each other;

wherein in response to receiving the request, the distributed computing service is configured to:

configure two or more of the plurality of compute nodes as a cluster of compute nodes according to a MapReduce distributed computing framework;

configure a single compute node of the cluster of compute nodes to implement a single mapper process; and establish a plurality of communication channels for a plurality of pairs of compute nodes of the cluster of compute nodes, wherein each communication channel of the plurality of communication channels is established between a respective pair of compute nodes of the cluster of compute nodes, and wherein a same public-private key pair that is specific to the cluster of compute nodes is used to establish each communication channel;

wherein the mapper process is configured to initiate execution of the application;

wherein, during execution, the application is configured to spawn respective ones of a plurality of commands of the application to each compute node of the pair of compute nodes to process a respective portion of the data set; and wherein, during execution of the application, the compute nodes of the pair of compute nodes exchange messages with each other over the respective communication channel using the message passing interface.

2. The distributed computing system of claim 1, wherein none of the compute nodes of the cluster of compute nodes are configured to implement a reducer process.

3. The distributed computing system of claim 1, wherein to establish a communication channel between a pair of compute nodes of the cluster of compute nodes, the distributed computing service is configured to:

store the public-private key pair for the cluster of compute nodes in the data store; and initiate execution of a process on each of the compute nodes of the pair of compute nodes to retrieve the public-private key pair from the data store.

4. The distributed computing system of claim 1, wherein in response to receiving the request, and prior to the initiation of the execution of the application, the distributed computing service is configured to:

initiate execution of a process on each of the compute nodes of the pair of compute nodes to retrieve a respective portion of the data set from the data store that is to be processed on the compute node.

5. The distributed computing system of claim 1, wherein the distributed computing service is configured to configure the two or more of the plurality of compute nodes as a cluster of compute nodes according to a MapReduce distributed computing framework within a virtual private cloud.

6. The distributed computing system of claim 1, wherein each of the two or more compute nodes of the cluster of compute nodes comprises one or more virtualized computing resource instances.

7. A method, comprising:

performing, by one or more computers:

creating a cluster of compute nodes on which an application is to be executed, wherein the cluster of compute nodes is implemented according to a MapReduce distributed computing framework, wherein the application processes a data set and implements a message passing interface through which compute nodes participating in execution of the application exchange messages with each other, and wherein said creating comprises:

generating a key pair for the cluster of compute nodes;

initiating retrieval of the key pair by each compute node in the cluster of compute nodes; and establishing a plurality of communication channels between compute nodes in each of two or more pairs of compute nodes in the cluster of compute nodes, wherein each communication channel of the plurality of communication channels is established dependent on the key pair;

executing the application on the cluster of compute nodes, wherein said executing comprises the compute nodes of at least one of the two or more pairs of compute nodes in the cluster of compute nodes exchanging messages with each other over the respective communication channel between compute nodes of the at least one pair of compute nodes using the message passing interface; and terminating the cluster of compute nodes responsive to completion of execution of the application.

8. The method of claim 7, wherein the method further comprises, prior to said executing:

configuring a single compute node of the cluster of compute nodes to implement a single mapper process; and initiating, by the mapper process, execution of the application; and wherein said executing comprises:

spawning, by the application, respective ones of a plurality of commands of the application to each compute node of the pair of compute nodes, each command indicating that a respective portion of the data set is to be processed by a process on the compute node to which it is spawned; and exchanging messages, by the compute nodes of the pair of compute nodes, over the respective communication channel using the message passing interface.

9. The method of claim 8, wherein said initiating comprises invoking a command that identifies one or more of: the application to be executed, a number of processes to be used in executing the application, or a list of compute nodes to which the commands are to be spawned; and wherein the list of compute nodes to which the commands are to be spawned comprises the pair of compute nodes.

10. The method of claim 8, wherein said initiating comprises invoking a command that identifies a mapping between each of the compute nodes of the cluster of compute nodes and a rank; and wherein the method further comprises, prior to said executing, downloading a respective portion of the data set from a data store to each of the compute nodes of the cluster of compute nodes, wherein the respective portion downloaded to each of the compute nodes of the cluster of compute nodes is dependent on the rank mapped to the compute node.

11. The method of claim 10, wherein said spawning respective ones of the commands to each compute node of the pair of compute nodes comprises spawning, to each compute node of the pair of compute nodes, a command to process the respective portion of the data set that was downloaded to the compute node, and wherein the command spawned to each compute node of the pair of compute nodes is dependent on the rank mapped to the compute node.

12. The method of claim 7, wherein said creating comprises creating a cluster of compute nodes within a virtual private cloud.

13. The method of claim 7,
wherein said creating and said executing are performed by a distributed computing service;
wherein the method further comprises, prior to said creating, the distributed computing service receiving a request to execute the application; and
wherein said creating and said executing are performed by the distributed computing service automatically in response to receiving the request.

14. The method of claim 7,
wherein the method further comprises, prior to said creating:
receiving a request to execute the application; and
receiving a request to perform a bootstrap action during said creating;
wherein the bootstrap action comprises invoking a process to perform one or more of said generating a key pair, said initiating retrieval of the key pair, or said establishing a communication channel.

15. The method of claim 7, further comprising:
subsequent to said generating a key pair and prior to said initiating retrieval of the key pair, storing the key pair in the data store; and
subsequent to retrieval of the key pair by all of the compute nodes in the cluster of compute nodes, deleting the key pair from the data store.

16. The method of claim 15,
wherein each of the compute nodes in the cluster of compute nodes has an access role that allows it to retrieve the key pair from the data store; and
wherein no compute node other than the compute nodes in the cluster of compute nodes has the access role that allows it to retrieve the key pair from the data store.

17. A non-transitory computer-accessible storage medium storing program instructions that when executed on one or more computers cause the one or more computers to implement a distributed computing service;
wherein the distributed computing service is configured to:
provision a plurality of virtualized resource instances as a cluster of compute nodes, wherein the cluster of compute nodes comprises a master compute node and a plurality of worker compute nodes;
configure the worker compute nodes for securely exchanging messages between themselves according to a message passing interface, wherein to configure the worker compute nodes for securely exchanging messages, the distributed computing service is configured to:
store a unique key pair for the cluster of compute nodes in an object data store;
initiate retrieval of the unique key pair from the object data store by each of the worker compute nodes; and
establishing a plurality of communication channels between worker compute nodes in each of two or more pairs of worker compute nodes in the cluster of compute nodes, wherein each communication channel of the plurality of communication channels is established dependent on the unique key pair;
begin executing, on the master compute node, an application that processes the data set and that implements the message passing interface, wherein said executing comprises:
the application forking respective ones of a plurality of commands of the application to each of the plurality of worker compute nodes;
the plurality of worker compute nodes performing the forked commands, wherein performing each of the forked commands comprises one of the plurality of worker compute nodes processing a portion of the data set;
the plurality of worker compute nodes exchanging messages between themselves using the unique key pair according to the message passing interface via a respective communication channel; and
terminating the cluster of compute nodes responsive to completion of execution of the application.

18. The non-transitory computer-accessible storage medium of claim 17, wherein to provision the virtualized resource instances as a cluster of compute nodes, the distributed computing service configures the virtualized resource instances as a cluster of compute nodes according to a MapReduce distributed computing framework.

19. The non-transitory computer-accessible storage medium of claim 17, wherein, prior to beginning executing the application, the distributed computing service is configured to download a respective portion of the data set from the object data store to each of the plurality of worker compute nodes for subsequent processing.

20. The non-transitory computer-accessible storage medium of claim 19, wherein one or more of said provisioning, said configuring, said downloading, and said executing are performed within a virtual private cloud.

* * * * *